(12) United States Patent
Kojima et al.

(10) Patent No.: US 12,491,635 B2
(45) Date of Patent: Dec. 9, 2025

(54) ROBOT CELL SYSTEM DESIGN DEVICE, METHOD, AND PROGRAM

(71) Applicant: OMRON Corporation, Kyoto (JP)

(72) Inventors: Takeshi Kojima, Kyoto (JP); Haruka Fujii, Kyoto (JP); Ryoichi Kuratani, Kyoto (JP)

(73) Assignee: OMRON Corporation, Kyoto (JP)

( * ) Notice: Subject to any disclaimer, the term of this patent is extended or adjusted under 35 U.S.C. 154(b) by 177 days.

(21) Appl. No.: 18/279,356

(22) PCT Filed: Jan. 19, 2022

(86) PCT No.: PCT/JP2022/001840
§ 371 (c)(1),
(2) Date: Aug. 29, 2023

(87) PCT Pub. No.: WO2022/185759
PCT Pub. Date: Sep. 9, 2022

(65) Prior Publication Data
US 2024/0139946 A1    May 2, 2024

(30) Foreign Application Priority Data
Mar. 3, 2021 (JP) .................................. 2021-033844

(51) Int. Cl.
*B25J 9/16*     (2006.01)
*G05B 19/4097*  (2006.01)

(52) U.S. Cl.
CPC ........... *B25J 9/1664* (2013.01); *B25J 9/1661* (2013.01); *G05B 19/4097* (2013.01); *G05B 2219/32085* (2013.01)

(58) Field of Classification Search
CPC . B25J 9/1664; B25J 9/1661; B25J 9/16; B25J 9/0096; B25J 9/1605; B25J 9/1628;
(Continued)

(56) References Cited

U.S. PATENT DOCUMENTS 6,470,301 B1    10/2002  Barral
6,526,373 B1    2/2003   Barral
(Continued)

FOREIGN PATENT DOCUMENTS

CN    105676642 A    6/2016
JP    H06-348769 A   12/1994
(Continued)

OTHER PUBLICATIONS

Lueth, "Automated Computer-Aided Layout Planning for Robot Workcells", Institute for Real-Time Computer Systems and Robotics, 1992, pp. 473-478.
(Continued)

*Primary Examiner* — Abby Lin
*Assistant Examiner* — Esvinder Singh
(74) *Attorney, Agent, or Firm* — Morgan, Lewis & Bockius LLP

(57) ABSTRACT

An acquisition unit acquires specification information about a robot that is a component of a robot cell system, member information including shape information about a member, other than the robot, which is also a component of the robot cell system, and work information relating to work to be performed by the robot. A layout planning unit calculates, based on the specification information, the member information, and the work information, one or more layout candidates for the robot and the member in the robot cell system. A pose planning unit calculates, for each layout candidate, a set of combinations of a start pose at a start point and an end pose at an end point of each operation of the robot. A route planning unit calculates, for each layout candidate, a set of routes from the start pose to the end pose of each combination of the start pose and the end pose.

17 Claims, 28 Drawing Sheets

(58) Field of Classification Search
CPC ........ B25J 9/163; B25J 9/1656; B25J 9/1666; G05B 19/4097; G05B 2219/32085; G05B 2219/31338; G05B 19/4188; G05B 2219/31054; G05B 2219/31076
See application file for complete search history.

(56) References Cited

U.S. PATENT DOCUMENTS

| | | | |
|---|---|---|---|
| 9,724,826 | B1 | 8/2017 | Prats |
| 11,209,798 | B1* | 12/2021 | Michalowski ..... G05B 19/4097 |
| 2010/0241248 | A1 | 9/2010 | Zhang et al. |
| 2016/0282855 | A1 | 9/2016 | Zhang |
| 2018/0036882 | A1 | 2/2018 | Kimura |
| 2018/0326580 | A1* | 11/2018 | Wessén ............ G05B 19/41885 |
| 2020/0406460 | A1 | 12/2020 | Enomoto et al. |
| 2021/0001481 | A1 | 1/2021 | Hayashi et al. |

FOREIGN PATENT DOCUMENTS

| | | |
|---|---|---|
| JP | 2001-249961 A | 9/2001 |
| JP | 2010-207997 A | 9/2010 |
| JP | 2018-020410 A | 2/2018 |
| JP | 2021-003779 A | 1/2021 |
| WO | 2019/176737 A1 | 9/2019 |

OTHER PUBLICATIONS

Rossgoderer et al., "A Concept for Automatical Layout Generation", IEEE International Conference on Robotics and Automation, 1995, pp. 800-805, XP000657267.
Extended European Search Report issued in corresponding European Patent Application No. 22762818.7, dated Jan. 2, 2025.
International Search Report issued in corresponding International Patent Application No. PCT/JP2022/001840 dated Mar. 15, 2022.
Written Opinion issued in corresponding International Patent Application No. PCT/JP2022/001840 dated Mar. 15, 2022.

\* cited by examiner

POSE OF ROBOT GREATLY CHANGES

REDUNDANT ROUTE

ROBOT CELL SYSTEM DESIGN DEVICE, METHOD, AND PROGRAM

TECHNICAL FIELD

The present disclosure relates to a robot cell system design device, a robot cell system design method, and a robot cell system design program.

BACKGROUND ART

In a design of a robot cell system, it is necessary to appropriately design a layout of a robot and each member and an operation of the robot so that an operation time of the system is within a target time. Techniques for supporting the design of such a robot cell system have been proposed.

For example, a layout setting device that sets a layout in which a robot arm and a peripheral device are arranged in a robot work space including the robot arm and the peripheral device has been proposed (see Patent Literature 1: Japanese Patent Application Laid-Open No. 2018-20410). The device described in Patent Literature 1 determines a teaching point through which a reference part of the robot arm is passed, corresponding to a specific operation in which the robot arm accesses the peripheral device. The device determines an initial layout of the robot arm and the peripheral device, and moves each device from the initial layout by metaheuristic calculation to update the layout. The device sets the layout by using an evaluation value relating to a fitness for the specific operation in the initial layout or the updated layout, and determines an optimum layout.

SUMMARY OF INVENTION

Technical Problem

In a current state of the robot cell system design, a person determines the layout of the robot and each member and the operation of the robot by trial and error until the operation time of the system reaches a target, and it takes a lot of man-hours and time.

In the technique described in Patent Literature 1, since the layout is updated by the metaheuristic calculation, it is necessary to evaluate enormous layout patterns and the operation patterns of the robot in a brute-force manner, and there is a problem that the calculation time becomes long.

The disclosure has been made in view of the above points, and an object of the disclosure is to reduce a time required for designing a cell system including a robot as a component.

Solution to Problem

In order to achieve the above object, a robot cell system design device according to the disclosure includes: an acquisition unit configured to acquire specification information about a robot that is a component of a robot cell system, member information including shape information about a member, other than the robot, which is also a component of the robot cell system, and work information relating to work to be performed by the robot; a layout planning unit configured to calculate, based on the specification information, the member information, and the work information, one or more layout candidates for the robot and the member in the robot cell system; a pose planning unit configured to calculate, based on the specification information, the member information, and the work information, for each layout candidate, a set of combinations of a start pose at a start point and an end pose at an end point of each operation of the robot; a route planning unit configured to calculate, based on the specification information, the member information, and the work information, for each layout candidate, a set of routes from the start pose to the end pose of each combination of the start pose and the end pose; and an evaluation unit configured to select, based on the routes, an optimum layout from the layout candidates.

The evaluation unit may calculate a route cost relating to the routes for each of the layout candidates, and select a layout candidate with a highest evaluation indicated by the route cost as the optimum layout.

The layout planning unit may calculate a layout cost relating to a layout for each layout pattern of the robot and the member, and select one or more patterns in descending order of evaluation indicated by the layout cost or one or more patterns in which the layout cost satisfies a predetermined condition as the layout candidate.

The layout cost may be a value based on at least one of a distance between members, an area or a volume of a region where the robot and the member are arranged, a distance between an obstacle and the member, or operability of the robot.

The pose planning unit may select, for each operation, a combination with a highest evaluation indicated by a pose cost relating to an operation time of the robot required for the work, among combinations of the start pose and the end pose according to a position and a pose when a hand part of the robot accesses the member.

The pose planning unit may calculate the start pose and the end pose by further using gripping information indicating a relative relationship between the hand part of the robot and a workpiece gripped by the hand part of the robot.

A grip planning unit configured to calculate the gripping information based on the specification information, the member information, and the work information may be further included.

The acquisition unit may further acquire constraint information designated by a user, the layout planning unit selects, in a case in which constraint information relating to a layout is acquired as the constraint information, the layout candidate from among layout patterns of the robot and the member, the patterns satisfying the constraint information, the pose planning unit calculates, in a case in which constraint information relating to a pose is acquired as the constraint information, a set of combinations of the start pose and the end pose satisfying the constraint information, and the route planning unit calculates, in a case in which constraint information relating to a route is acquired as the constraint information, a set of routes satisfying the constraint information.

The constraint information may include at least one of a positional relationship between members, an unarrangeable region of the member, a designated position where the member is arranged, a clearance with respect to the member, a designated pose, or a designated route.

A determination unit configured to determine appropriateness of a plan in each of the layout planning unit, the pose planning unit, and the route planning unit may be further included.

The determination unit may present a determination result to the user in a case in which it is determined that the appropriateness of the plan is not satisfied.

Each of the layout planning unit, the pose planning unit, and the route planning unit may stop processing when the determination unit determines that the appropriateness of the plan is not satisfied.

The determination unit may determine that the appropriateness of the plan is satisfied, in layout candidates planned by the layout planning unit, in a case in which the member falls within an arrangeable area, and in a case in which a layout cost indicating appropriateness of layout is equal to or more than a threshold, in a case in which the start pose and the end pose planned by the pose planning unit do not interfere with another member or an obstacle, and in a case in which a difference between the start pose and the end pose is equal to or less than a threshold, and in a case in which the route can be calculated by the route planning unit, and in a case in which the operation time of the robot required for the work is equal to or less than a predetermined value.

The acquisition unit may further acquire selection information for selecting an executable planning mode for obtaining a solution and an optimum planning mode for obtaining a desired solution, and an end condition according to the executable planning mode or the optimum planning mode to be selected, and the robot cell system design device may further include a control unit configured to perform control to cause the layout planning unit to calculate the layout candidate different from a previous layout until the end condition is satisfied, cause the pose planning unit and the route planning unit to repeatedly execute processing, and cause the evaluation unit to select, as a final layout, the optimum layout having the highest evaluation indicated by the route cost among the optimum layouts obtained for each repeated processing.

In a case in which the optimum planning mode is selected, the control unit may present, to a user, a layout with a highest evaluation indicated by a route cost at a current stage for each repeated processing, and receive an instruction to stop the repeated processing from the user.

A robot cell system design method according to the disclosure includes: acquiring, by an acquisition unit, specification information about a robot that is a component of a robot cell system, member information including shape information about a member, other than the robot, which is also a component of the robot cell system, and work information relating to work to be performed by the robot; calculating, by a layout planning unit, based on the specification information, the member information, and the work information, one or more layout candidates for the robot and the member in the robot cell system; calculating, by a pose planning unit, based on the specification information, the member information, and the work information, for each layout candidate, a set of combinations of a start pose at a start point and an end pose at an end point of each operation of the robot; calculating, by a route planning unit, based on the specification information, the member information, and the work information, for each layout candidate, a set of routes from the start pose to the end pose of each combination of the start pose and the end pose; and selecting, by an evaluation unit, based on the routes, an optimum layout from the layout candidates.

A robot cell system design program according to the disclosure is a program for causing a computer to execute as: an acquisition unit configured to acquire specification information about a robot as a component of a robot cell system, member information including shape information about a member, other than the robot, as the component of the robot cell system, and work information relating to work to be performed by the robot; a layout planning unit configured to calculate, based on the specification information, the member information, and the work information, one or more layout candidates for the robot and the member in the robot cell system; a pose planning unit configured to calculate, based on the specification information, the member information, and the work information, for each layout candidate, a set of combinations of a start pose at a start point and an end pose at an end point of each operation of the robot; a route planning unit configured to calculate, based on the specification information, the member information, and the work information, for each layout candidate, a set of routes from the start pose to the end pose of each combination of the start pose and the end pose; and an evaluation unit configured to select, based on the routes, an optimum layout from the layout candidates Advantageous Effects of Invention According to the robot cell system design device, method, and program according to the disclosure, it is possible to reduce a time required for designing a cell system including a robot as a component.

DESCRIPTION OF EMBODIMENTS

Figure 1:
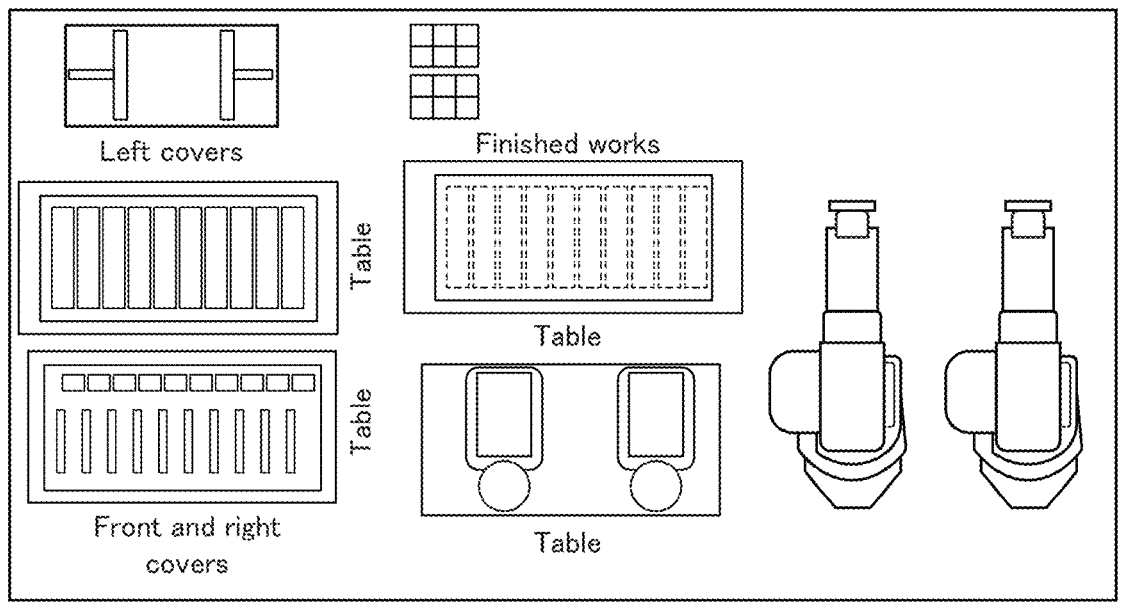
FIG. 1 is a diagram for describing a purpose and input/output of each embodiment.
Figure 1:
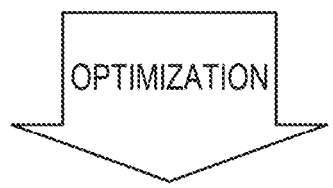
Figure 1:
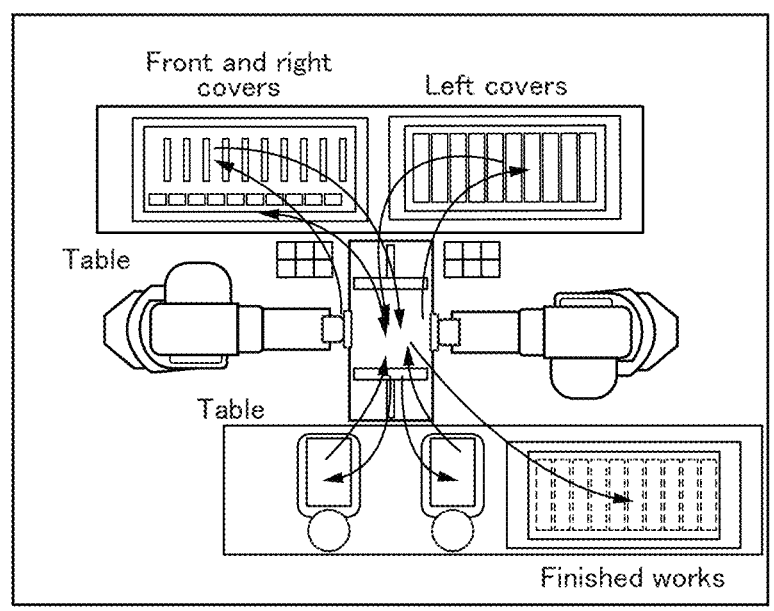

Hereinafter, examples of embodiments of the disclosure will be described with reference to the drawings. In the drawings, the same or equivalent components and portions are denoted by the same reference numerals. Dimensions and ratios of the drawings are exaggerated for convenience of description, and may be different from actual ratios.

<Purpose and Input/Output of Each Embodiment>

First, a purpose and input/output common to each embodiment described in detail below will be described.

As illustrated in FIG. 1, a robot cell system design device according to each embodiment designs a robot which is a component of a cell system, a layout of a workpiece to be worked and a member including a jig for handling the workpiece, and an operation of the robot. In the example of FIG. 1, Left covers, Tabele, Front and right covers, and Finished works are examples of the members. In order to perform these designs, specification information about the robot, member information including shape information about the member, and work information relating to a work to be performed by the robot are input to the robot cell system design device. Details of each piece of information will be described later.

In the technique of Patent Literature 1 described above, when a robot cell system is designed, a teaching point is set for an initial solution of a layout of the robot and the member, an operation of the robot is calculated, and optimized design is performed with a takt time or the like as a cost. In general, an amount of calculation for calculating the operation of the robot is large, and for example, it takes several seconds to calculate one operation. Since the layout design of the robot and the member is an NP-difficult problem, optimization requires several tens of thousands to several hundreds of thousands of trials. Therefore, in the method of calculating the operation of the robot in a certain layout and optimizing the operation while evaluating the cost related to the operation as in the technique described in Patent Literature 1, there is a problem that it is practically impossible to calculate an optimum solution in real time.

In the robot cell system, it is desirable to use a plurality of robots in order to increase the speed of work and increase the number of functions. For example, it is assumed that work in the cell system is speeded up by causing a plurality of robots to execute work in parallel or expanding an entire movable range by using a plurality of robots. There is also a case where pluralization is achieved by causing a plurality of robots to execute one work in cooperation. In a case in which a plurality of robots are included in the cell system as described above, it is necessary to design an operation of each robot, so that more time is required for optimization calculation. Therefore, constraints to prevent solution divergence and an efficient optimum solution search method are required.

Figure 2:
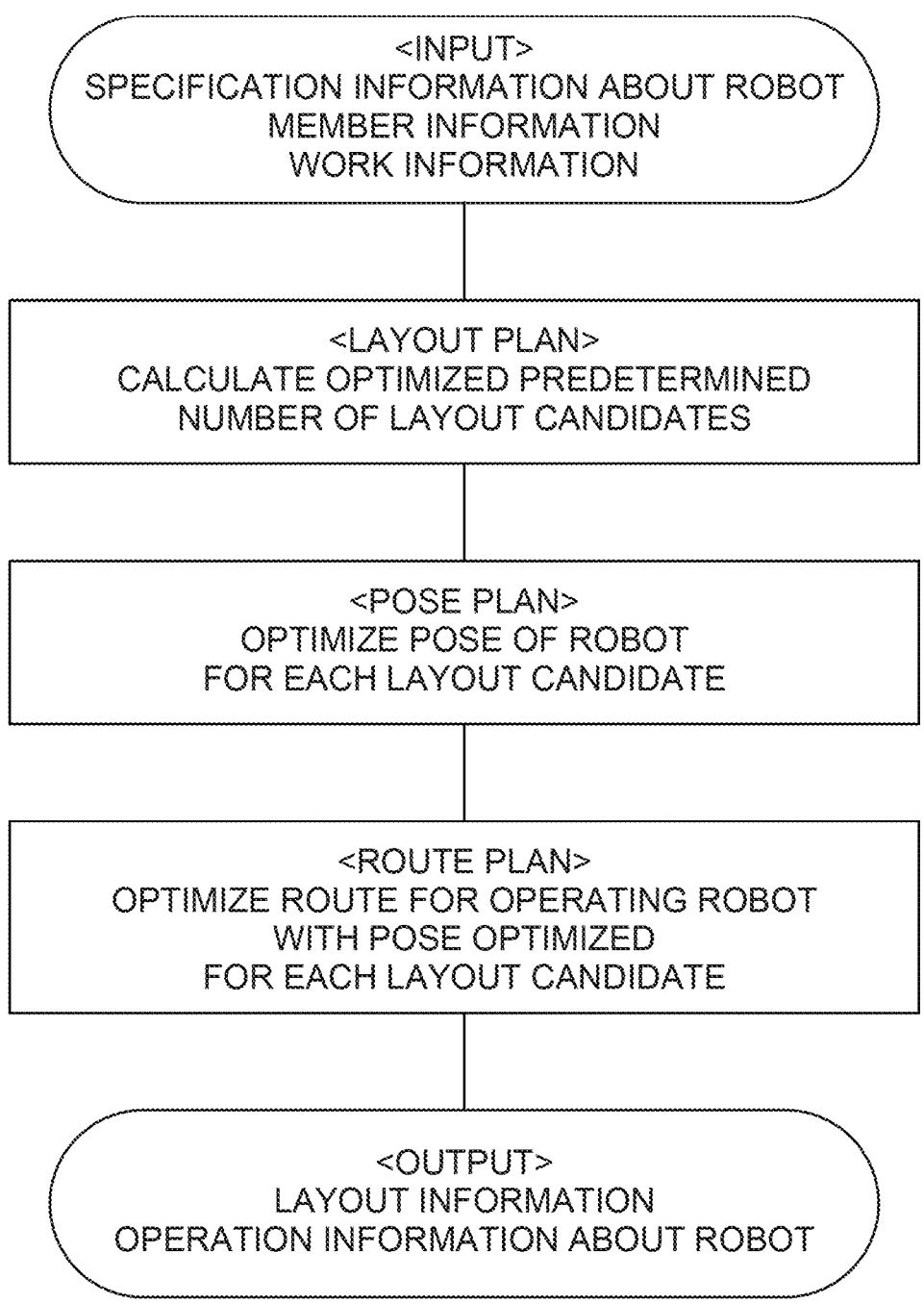
FIG. 2 is a diagram for describing a purpose and input/output of each embodiment.

In each of the following embodiments, as illustrated in FIG. 2, a layout plan, a pose plan, and a route plan are processed in stages in order to output the optimized layout information and the operation information about the robot with respect to the input of the specification information about the robot, the member information, and the work information. In the layout plan, a predetermined number of optimized layout candidates are calculated from a plurality of possible layout patterns of the robot and the member. In the layout plan, for example, optimization is performed by using a layout cost with a short calculation time (μsec order) such as operability of the robot. In the pose plan, the start pose at the start point and the end pose at the end point of the operation of the robot are optimized for each layout candidate. In the route plan, a route from the start pose to the end pose optimized for each layout candidate is optimized.

An optimum solution of the pose and an optimum solution of the route are uniquely determined with respect to the layout. Therefore, as illustrated in FIG. 2, by processing the layout plan, the pose plan, and the route plan in stages, the number of executions of the route plan with a high calculation cost can be reduced from several tens of thousands to several hundreds of thousands to the number of layout candidates. This makes it possible to calculate the optimum solution of the layout and the operation of the robot within a practical time.

In the current robot cell system, the operation of the robot may not be appropriately designed, and the reason for this is that the start pose and the end pose of the robot operation are not properly planned. Therefore, as illustrated in FIG. 2, by performing the pose plan between the layout plan and the route plan, optimizing the start pose and the end pose, and executing the route plan, the layout and the operation of the robot can be appropriately calculated, and the calculation time thereof can be reduced.

Hereinafter, each embodiment will be described in detail. In each embodiment, a case where the robot that is a component of the robot cell system is a vertical articulated robot having a configuration of six degrees of freedom necessary for the operation in a three-dimensional space will be described. More specifically, the robot is configured by coupling a plurality of links, and a tool such as a robot hand is attached to an arm tip of the robot. The coupling between the links is referred to as a joint (joint). A reference position of the arm tip (a side on which a tool such as a robot hand is attached) of the robot is referred to as a tool center point (TCP).

The pose of the robot is represented by a sequence ($\theta_{J1}, \theta_{J2}, \ldots, \theta_{JN}$) of values (rotation angles) of joints from a first joint (joint J1) to an N-th joint (joint JN, N is the number of joints of the robot) of the robot in a case in which it is assumed that the TCP is at a predetermined position (x, y, z) and pose (roll, pitch, yaw). In each of the following embodiments, J1, J2, . . . are assumed in order from a base side toward the arm tip of the robot. A route is obtained by arranging the poses of the robot at each time when the TCP is operated from an arbitrary start point to an end point in time series, and operation information is obtained by adding information on a speed and acceleration for changing the pose to the route.

First Embodiment

Figure 3:
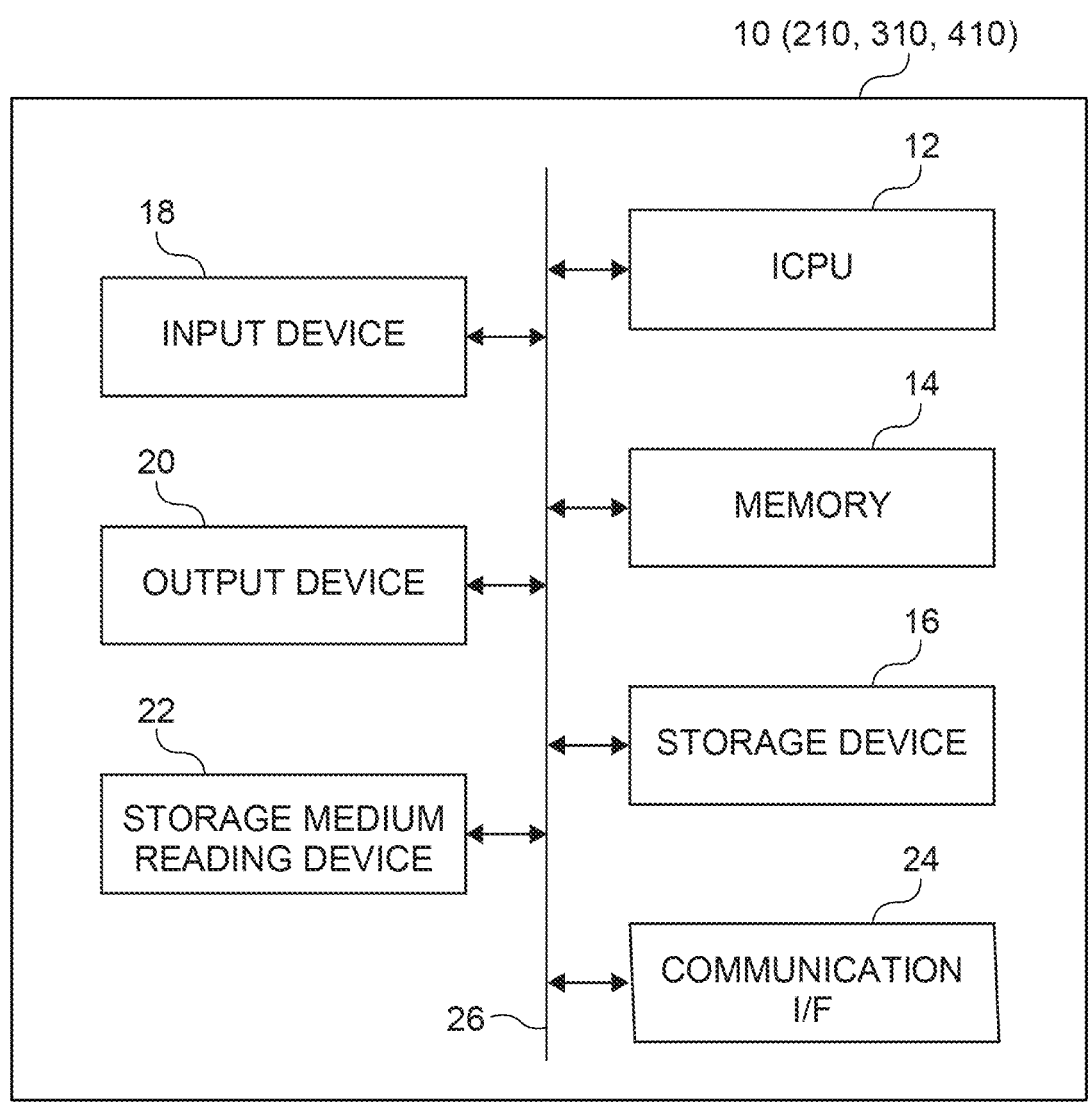
FIG. 3 is a block diagram illustrating a hardware configuration of a robot cell system design device.

FIG. 3 is a block diagram illustrating a hardware configuration of a robot cell system design device 10 according to the first embodiment. As illustrated in FIG. 3, the robot cell system design device 10 includes a central processing unit (CPU) 12, a memory 14, a storage device 16, an input device 18, an output device 20, a storage medium reading device 22, and a communication interface (I/F) 24. The respective configurations are communicably coupled to each other via a bus 26.

The storage device 16 stores a robot cell system design program for executing robot cell system design processing described later. The CPU 12 is a central arithmetic processing unit, and executes various programs and controls each configuration. That is, the CPU 12 reads a program from the storage device 16 and executes the program by using the memory 14 as a work region. The CPU 12 performs control of each of the above-described configurations and various types of arithmetic processing according to the program stored in the storage device 16.

The memory 14 includes a random access memory (RAM), and temporarily stores a program and data as a work region. The storage device 16 includes a read only memory (ROM), a hard disk drive (HDD), a solid state drive (SSD), and the like, and stores various programs including an operating system and various data.

The input device 18 is a device for performing various inputs, such as a keyboard or a mouse. The output device 20 is, for example, a device for outputting various types of information, such as a display or a printer. A touch panel display may be employed as the output device 20 to function as the input device 18. The storage medium reading device 22 reads data stored in various storage media such as a compact disc (CD)-ROM, a digital versatile disc (DVD)-ROM, a Blu-ray disc, or a universal serial bus (USB) memory, writes data to the storage medium, and the like.

The communication I/F 24 is an interface for communicating with other devices, and for example, standards such as Ethernet (registered trademark), FDDI, or Wi-Fi (registered trademark) are used.

Figure 4:
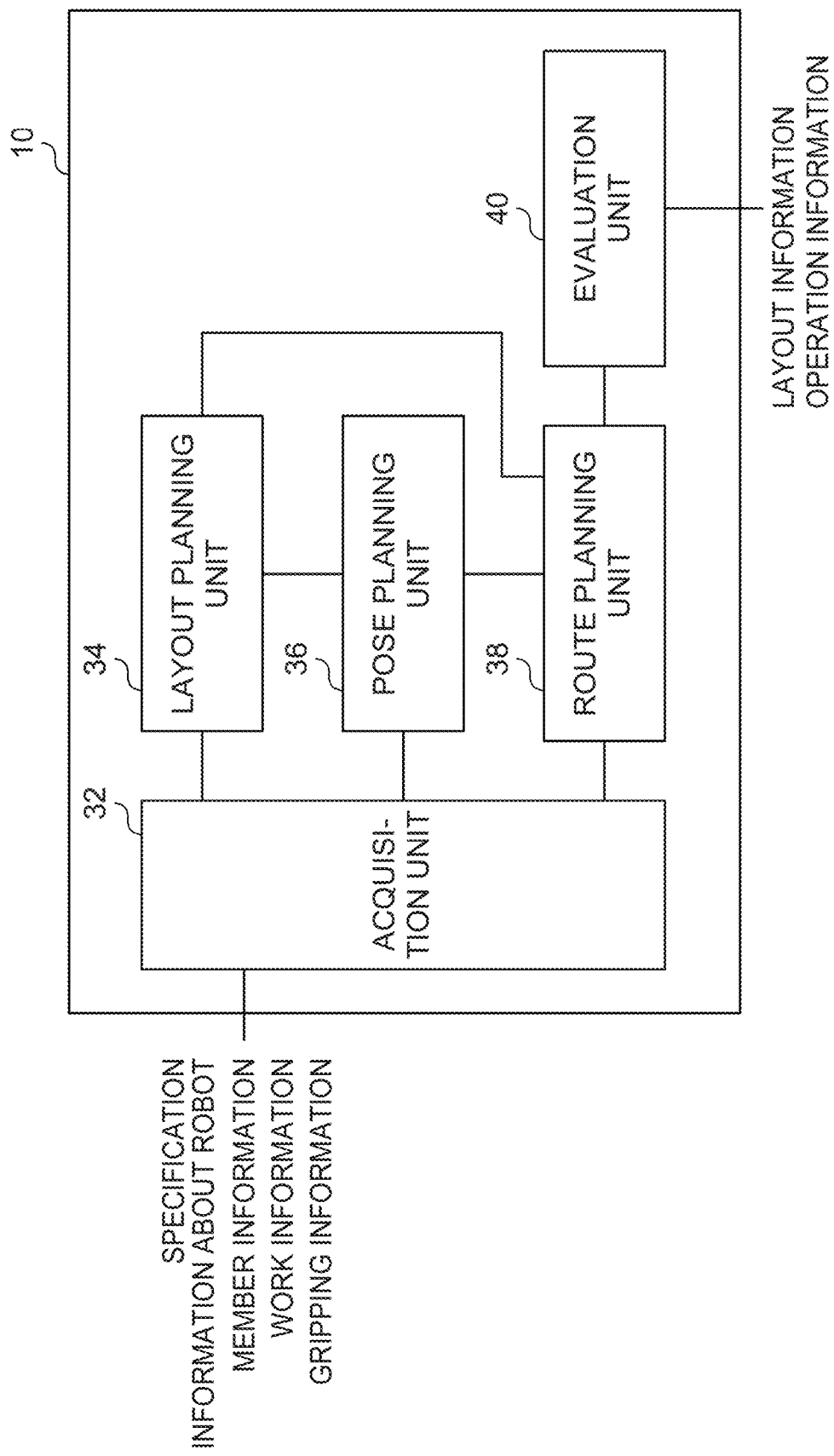
FIG. 4 is a block diagram illustrating an example of a functional configuration of a robot cell system design device according to a first embodiment.

Next, a functional configuration of the robot cell system design device 10 according to the first embodiment will be described. FIG. 4 is a block diagram illustrating an example of a functional configuration of the robot cell system design device 10. As illustrated in FIG. 4, the robot cell system design device 10 includes an acquisition unit 32, a layout planning unit 34, a pose planning unit 36, a route planning unit 38, and an evaluation unit 40 as functional configurations. Each functional configuration is implemented by the CPU 12 reading the robot cell system design program stored in the storage device 16, developing the program in the memory 14, and executing the program.

The acquisition unit 32 acquires specification information about a robot which is a component of the robot cell system, member information about a member other than the robot which is the component of the robot cell system, and work information relating to work to be performed by the robot. The specification information about the robot includes kinematics information indicating a coupling relationship between links and a structure such as a rotation axis of a link, dynamics information which is information for specifying a speed or the like at the time of operation of a link such as a weight of each link, and shape information of each link. The member information includes shape information of a jig and a workpiece as members, and peripheral devices such as a machining device or an inspection device. Each piece of shape information may be three-dimensional data such as computer-aided design (CAD) data. The work information includes information such as a type of work, an order of work, a member used in the work and a position where the robot accesses the member, a workpiece used in the work, or a gripping state indicating which portion of the workpiece is gripped by which portion of the robot hand. Examples of the robot's access to the member include gripping (picking) of the workpiece by the robot hand, releasing (releasing) of the workpiece, attachment of the workpiece to a predetermined position, and the like.

Figure 5:
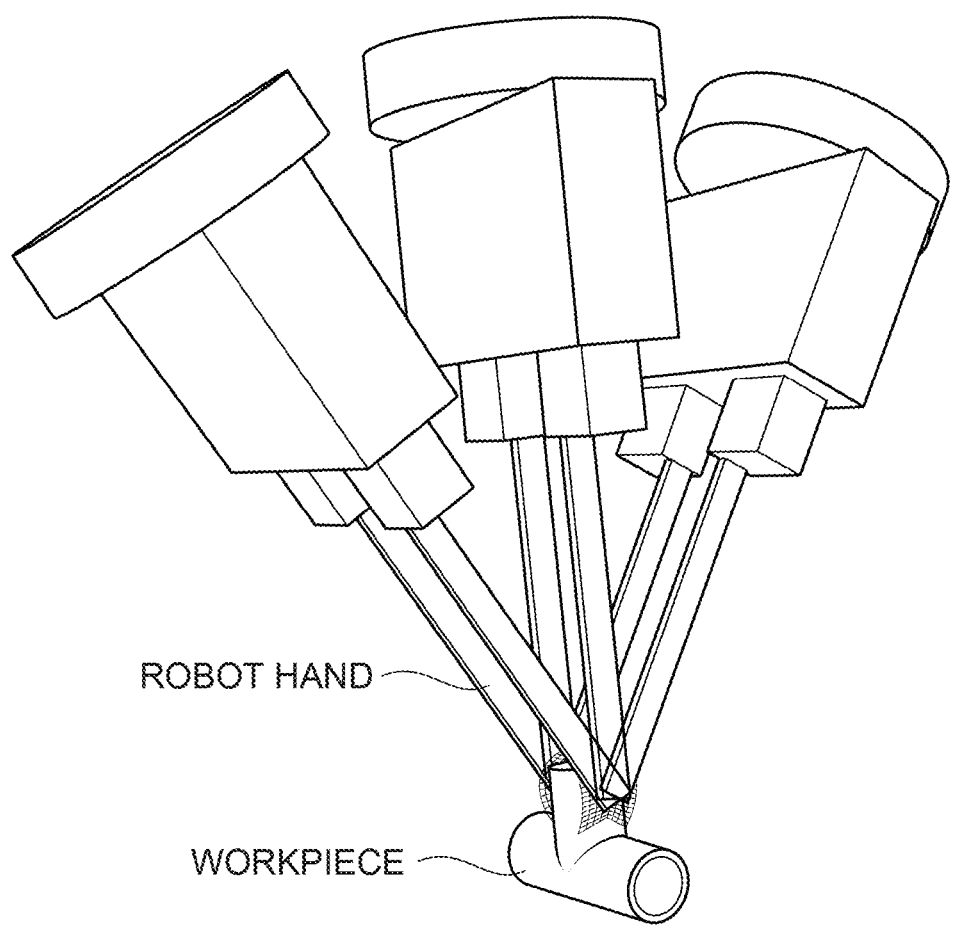
FIG. 5 is a diagram for describing gripping information.

The acquisition unit 32 acquires gripping information indicating a relative relationship between the workpiece and the robot hand. For example, as illustrated in FIG. 5, the gripping information is relative coordinates (x, y, z) and a relative pose (roll, pitch, yaw) of the TCP with respect to the workpiece when the workpiece is gripped by the robot hand. The gripping information acquired by the acquisition unit 32 is a list of gripping information for a plurality of gripping patterns. In the example of FIG. 5, three gripping patterns are illustrated, but the list includes gripping information of more gripping patterns (for example, several tens of patterns).

The specification information about the robot, member information, work information, and gripping information are input to the robot cell system design device 10 via the input device 18, the storage medium reading device 22, or the communication I/F 24. The acquisition unit 32 passes the acquired specification information about the robot, the member information, and the work information to each of the layout planning unit 34, the pose planning unit 36, and the route planning unit 38. The acquisition unit 32 passes the acquired gripping information to the pose planning unit 36.

The layout planning unit 34 calculates one or more layout candidates of the robot and the member in the robot cell system based on the specification information about the robot, the member information, and the work information passed from the acquisition unit 32. Specifically, the layout planning unit 34 calculates a layout cost relating to a layout for each of layout patterns of the robot and the member. The layout pattern is a pattern of a layout that can be taken by the robot and the member, that is, all patterns that can be arranged, and may be, for example, a pattern of a layout in which all of the robot and the member fall within a predetermined layout area.

Figure 6:
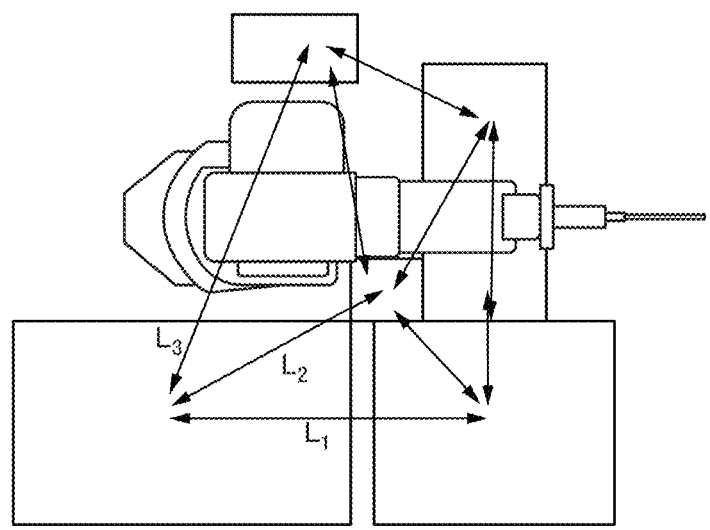
FIG. 6 is a diagram for describing an example of a layout cost.

The layout cost may be a value using geometric information such as a distance between members, an area or a volume of a region where the robot and the member are arranged, or a distance between an obstacle and the member. For example, as illustrated in FIG. 6 and the following formula (1), a value that increases as a sum of inter-member distances $L_1, L_2, L_3, \ldots,$ and $L_N$ increases may be set as a layout cost c. In FIG. 6, only some inter-member distances are illustrated because all inter-member distances are complicated.

[Mathematical Formula 1]

$$c = \sum_{n=1}^{N} L_n \qquad (1)$$

Figure 7:
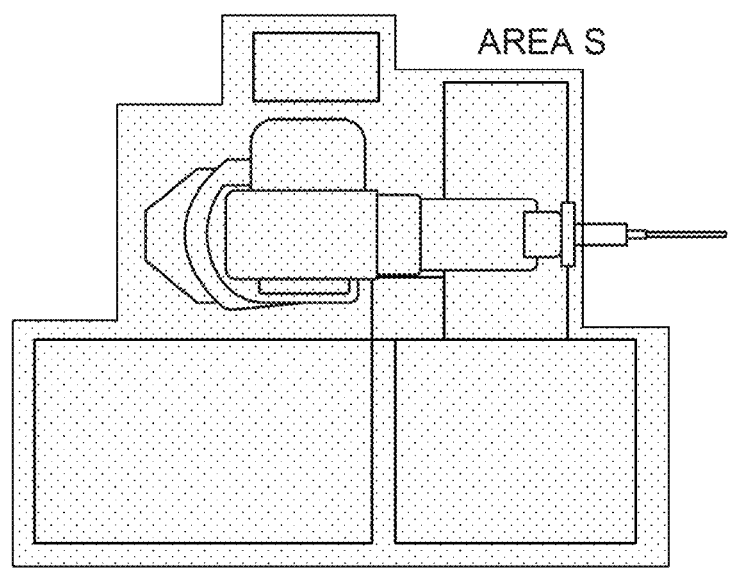
FIG. 7 is a diagram for describing an example of a layout cost.

For example, as shown in FIG. 7 and the following formula (2), a value that increases as an area S of a circumscribed shape of an installation portion of the robot and the member on a floor surface increases may be set as the layout cost c.

$$c = S \qquad (2)$$

A volume V obtained by multiplying the area S by heights of the robot and each member may be used as the layout cost c.

Figure 8:
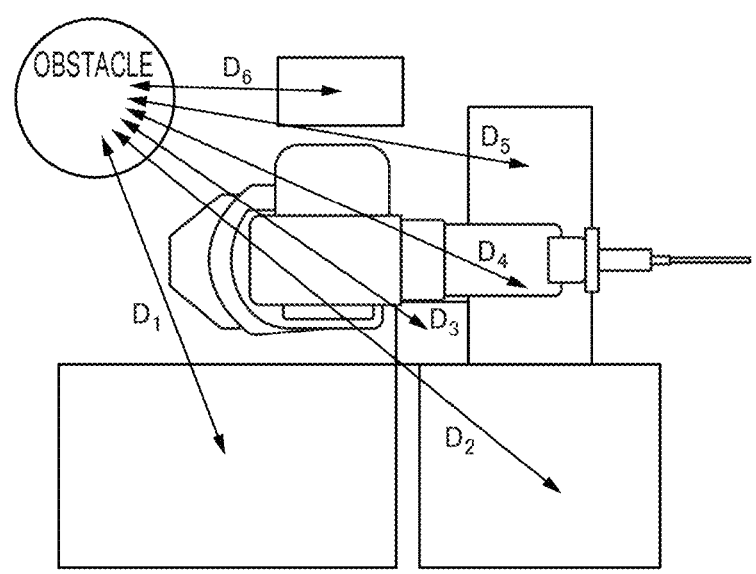
FIG. 8 is a diagram for describing an example of a layout cost.

For example, as illustrated in FIG. 8 and the following formula (3), a value that decreases as a sum of distances $D_1$, $D_2$, $D_3$, ..., $D_N$ between each member and the obstacle increases may be set as the layout cost c. By using the distance between the member and the obstacle as the layout cost, it is possible to exclude a solution excluded in the route plan due to interference with the obstacle at the stage of the layout plan, and it is possible to contribute to an improvement in a success rate of the route plan and an increase in speed.

[Mathematical Formula 2]

$$c = \frac{1}{\sum_{n=1}^{N} D_n} \qquad (3)$$

Figure 9:
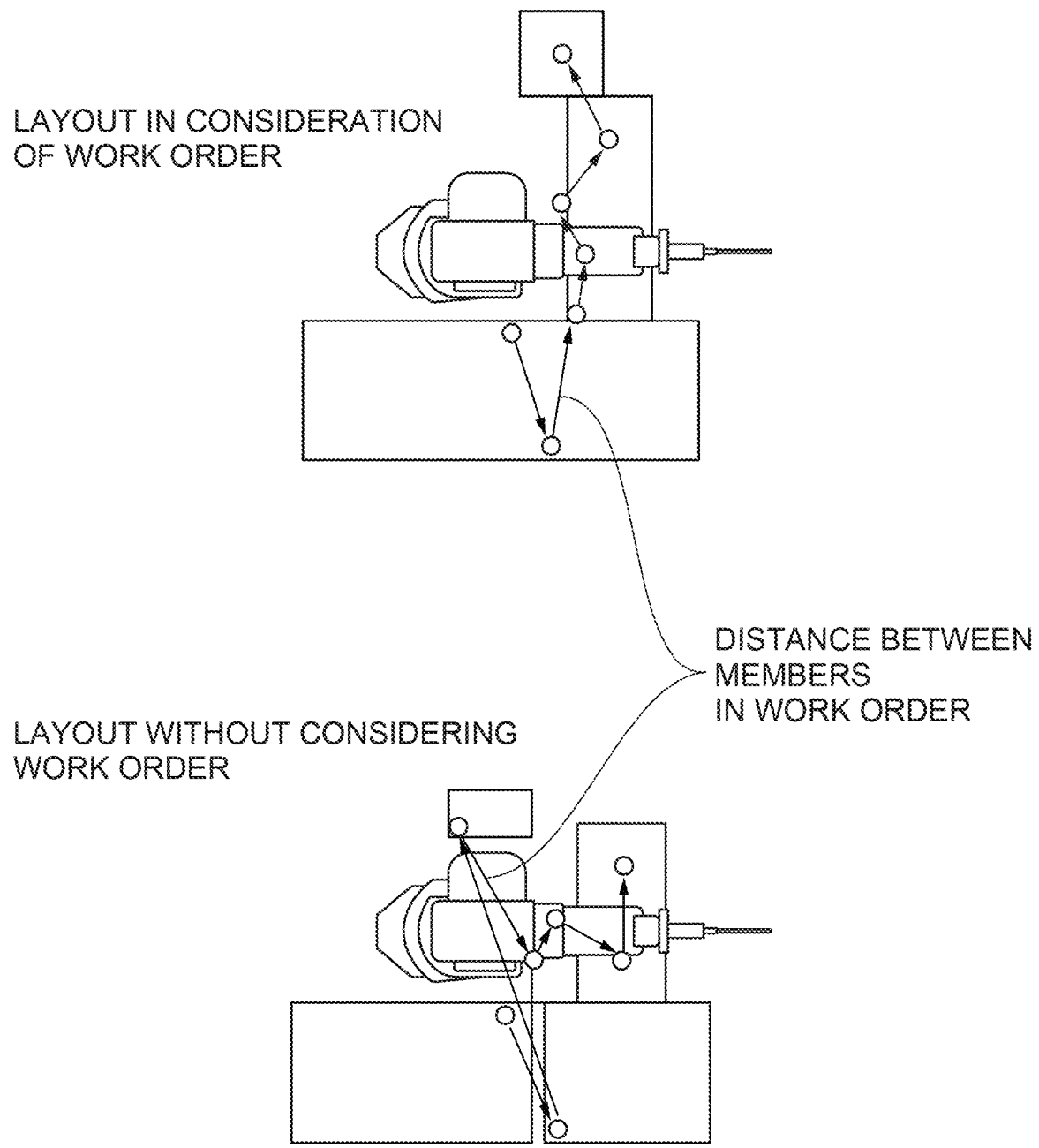
FIG. 9 is a diagram for describing an example of a layout cost in consideration of work information.

The smaller the value of the layout cost c in the above formulas (1) to (3) is, the higher the evaluation of the layout is. The layout planning unit 34 may calculate the layout cost for multipurpose optimization by using a plurality of the values c. The layout planning unit 34 may reflect a work order indicated by the work information on the layout cost c. For example, as illustrated in an upper diagram of FIG. 9, the operation time of the robot is often shortened when members related to the work of the robot are arranged in the work order. In this regard, as illustrated in a lower diagram of FIG. 9, in a case of a layout in which only the inter-member distance is minimized without considering the work order, there is a case where the operation becomes redundant and the operation time is extended. Based on this, for example, the layout planning unit 34 may calculate the sum of the inter-member distances in the work order of the robot as the layout cost. In FIG. 9, each circle is a work point of the robot. The work point is a position at which the robot accesses a member to be worked in the layout.

Figure 10:
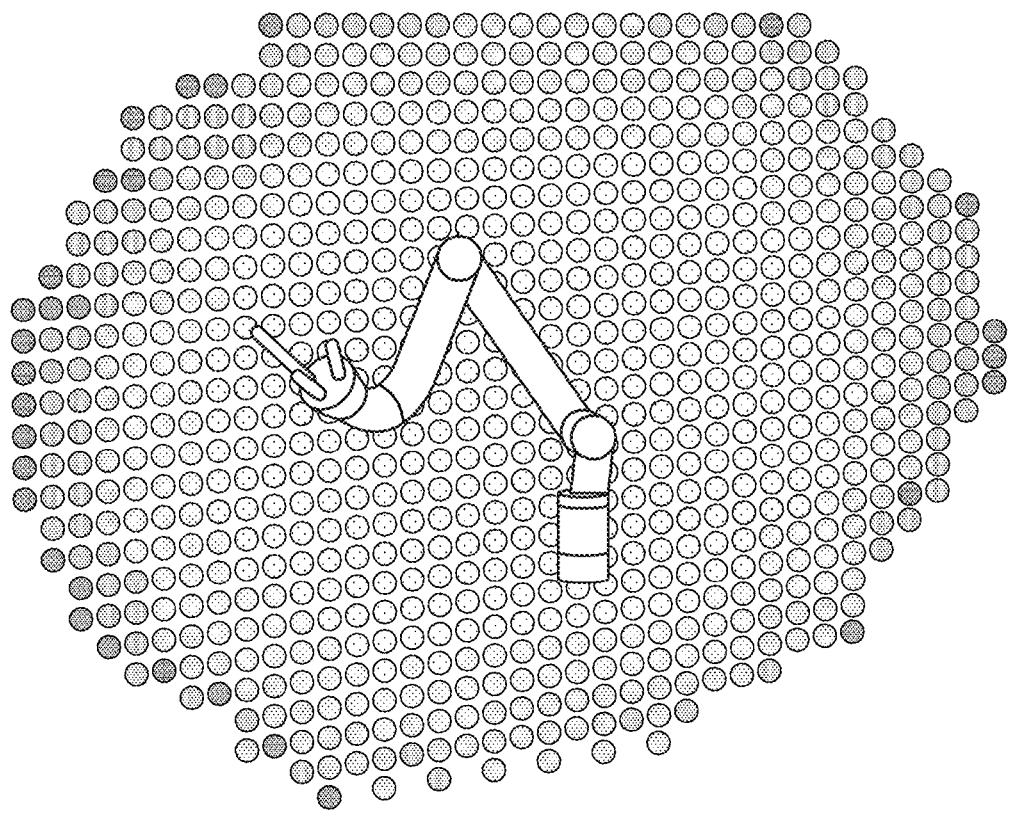
FIG. 10 is a diagram schematically illustrating operability of a robot as an example of a layout cost.

The layout cost may be a value based on the operability of the robot. The operability is an index indicating ease of movement from a certain pose when the robot takes the pose. The operability depends on the geometry (kinematics) of the robot. FIG. 10 schematically illustrates the operability. In the example of FIG. 10, it is represented that a point having a lighter color (density) is at a spatial position where a pose with higher operability can be taken. An operability w is calculated by the following formula (4).

[Mathematical Formula 3]

$$w = |\det J(q)| \qquad (4)$$

$$q = [q_1, q_2, \ldots, q_n]^T$$

$$r = [r_1, r_2, \ldots, r_m]^T$$

-continued $$J(q) = \begin{bmatrix} \frac{\partial r_1}{\partial q_1} & \cdots & \frac{\partial r_1}{\partial q_n} \\ \vdots & \ddots & \vdots \\ \frac{\partial r_m}{\partial q_1} & \cdots & \frac{\partial r_m}{\partial q_n} \end{bmatrix}$$

A bold q in the mathematical formula is a pose of a robot, that is, a vector of a value (rotation angle) of each joint. A bold r in the mathematical formula is a position and a pose (x, y, z, roll, pitch, yaw) of a predetermined part of the arm tip of the robot. A bold J (q) in the mathematical formula is Jacobian of the pose q of the robot. The layout cost based on the operability may be, for example, a sum of values of the operability of the positions where the members are arranged. By using the operability of the robot as the layout cost, variations of the solution (details will be described later) of inverse kinematics in the pose plan increase, a better solution can be obtained, and this can contribute to improvement of a success rate of the route plan.

The layout planning unit 34 selects one or more layout patterns in descending order of evaluation of the layout indicated by the layout cost calculated for each layout pattern as layout candidates. The layout planning unit 34 may select, as the layout candidates, a pattern in which the layout cost satisfies a predetermined condition, for example, a pattern in which the layout cost is equal to or less than a threshold. The layout planning unit 34 passes information on the selected one or more layout candidates to the pose planning unit 36 and the route planning unit 38.

The pose planning unit 36 calculates a start pose at a start point of the operation of the robot and an end pose at an end point of the operation for each layout candidate passed from the layout planning unit 34 based on the specification information about the robot, the member information, the work information, and the gripping information passed from the acquisition unit 32. Here, one unit of the operation is the operation of the robot when the TCP of the robot is moved from a certain work point to a next work point. A robot in a robot cell system continuously executes a plurality of operations. For example, in the example illustrated in FIG. 9, an arrow between work points corresponds to one operation. A work point on a starting point side of an arrow is the start point of the operation, and a work point on an end point side of an arrow is the end point of the operation. Therefore, the pose planning unit 36 calculates a set of combinations of a start pose and an end pose for each operation for one layout candidate.

Specifically, the start pose is calculated as follows. The pose planning unit 36 specifies a position and a pose of the TCP when the robot hand grips a workpiece. For example, the pose planning unit 36 specifies a position where the workpiece to be worked is arranged, that is, a work point in the layout candidates, specifies a relative position and a relative pose of the TCP with respect to the workpiece by using the gripping information, and converts the relative position and the relative pose into a position and a pose in a world coordinate system. Then, the pose planning unit 36 calculates the pose of the robot, that is, a value of each joint from the position and the pose of the TCP by inverse kinematics by using the kinematics information and the like. Similarly in the case of the end pose, the pose planning unit 36 specifies a position and a pose of the TCP at the time of releasing or attaching the workpiece based on the work information, and calculates the pose of the robot in the same manner as described above.

Figure 11:
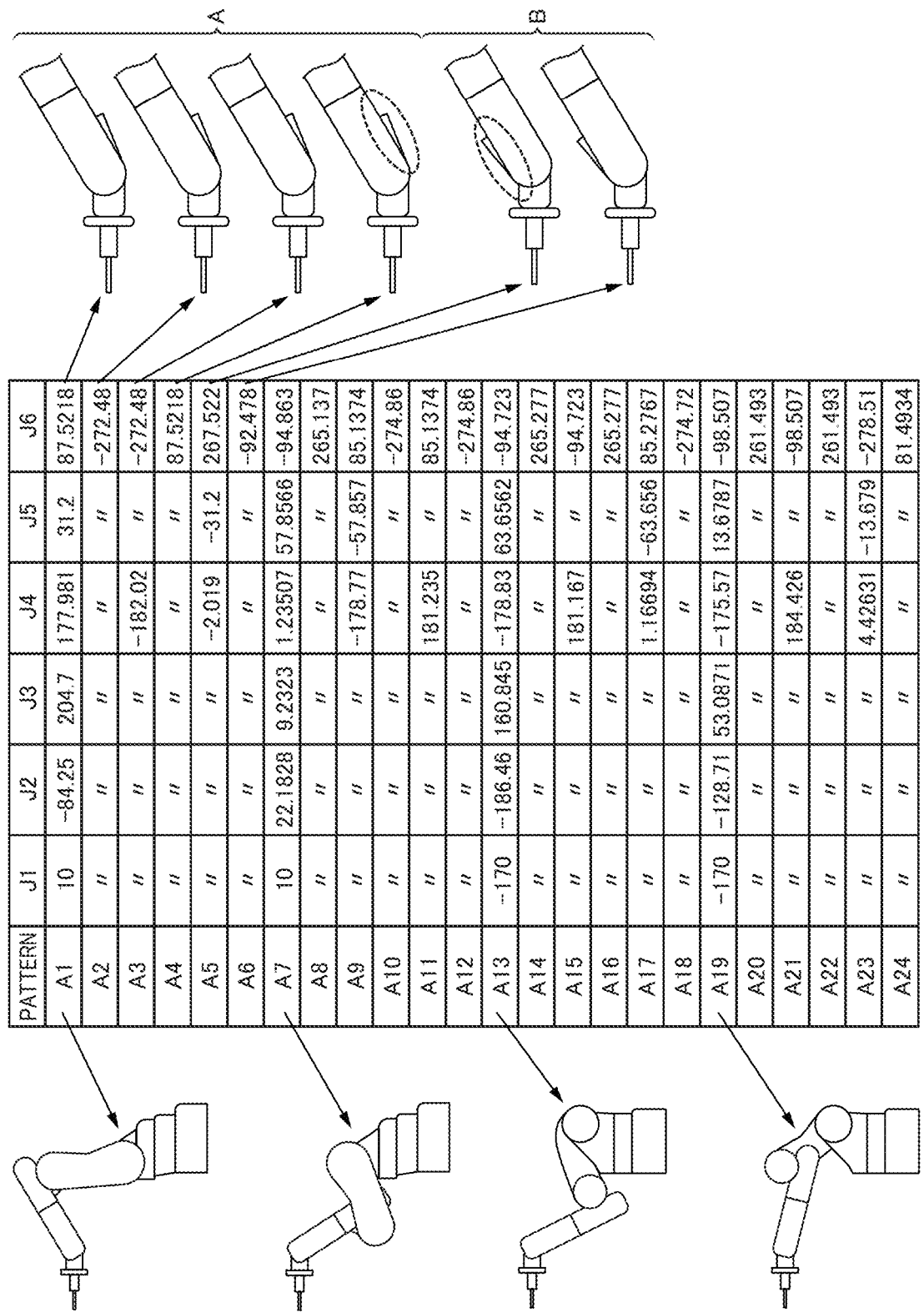
FIG. 11 is a diagram illustrating an example of a list of poses of a robot.

Here, in the pose plan, it should be noted that the pose of the robot serving as the start point and the end point of the operation has a large influence on the operation time, and a vertical articulated robot has a large degree of freedom in a pose and a movement, and it is difficult to select an optimum pose. FIG. 11 illustrates an example of a list of the poses of the robot calculated for the position and the pose of the TCP at the start point of the operation calculated from the work information, the gripping information, or the like. In the example illustrated in FIG. 11, there are four variations in the values of the joints J1 to J3, and among them, there are six variations in the combinations of J4 to J6, and a total of 24 patterns of robot poses are calculated. For the six variations of the combinations of J4 to J6, appearances of the poses of the robot in a same group (A or B) are the same, but the values of J4 to J6 are different from each other. In the example of FIG. 11, the positions of the protruding portions (broken line portions in FIG. 11) of the robots are different between the group A and the group B. Such a pattern is also calculated for the position and the pose of the TCP at the end point of the operation, and a combination of the start pose and the end pose is calculated.

Figure 12:
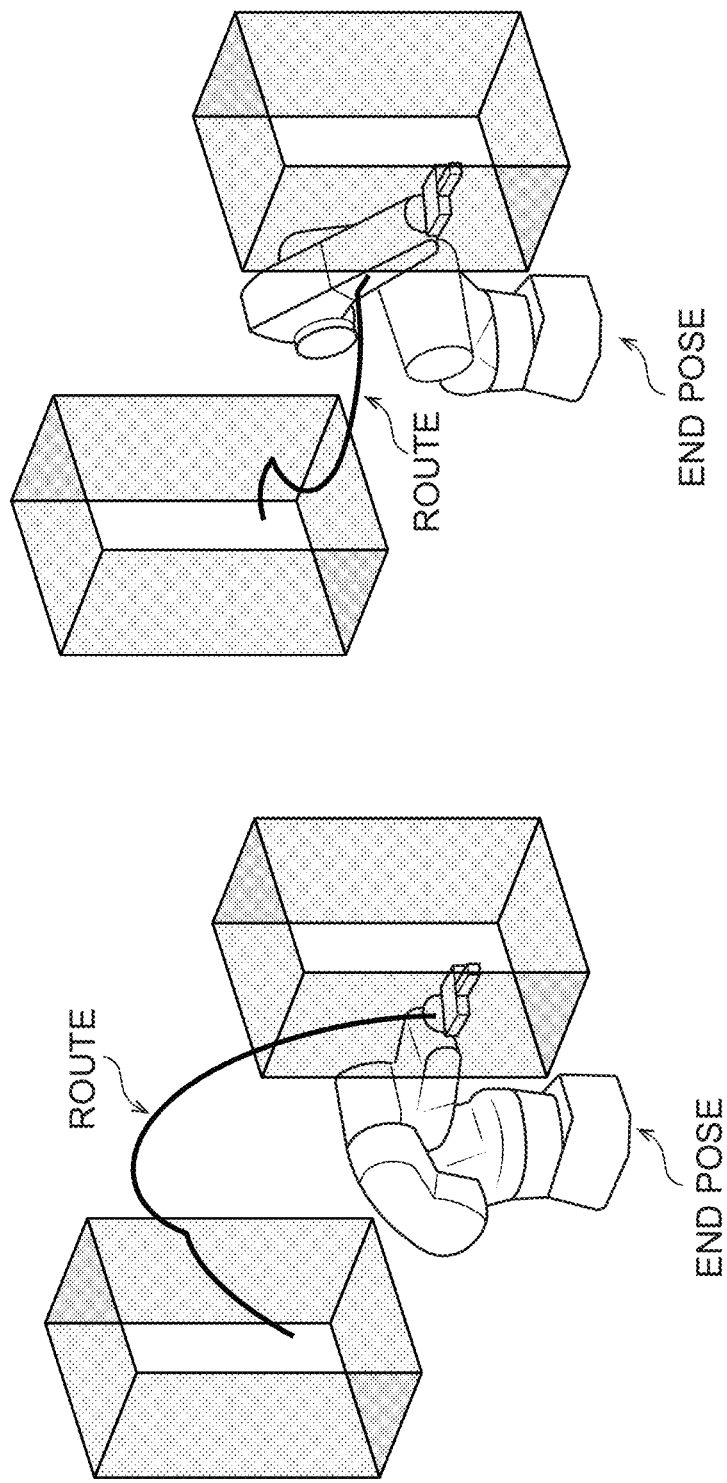
FIG. 12 is a diagram for describing a difference in an operation time due to a difference in a start pose and an end pose.

The operation time required for the operation from the start pose to the end pose varies depending on the start pose and the end pose of the robot. For example, FIG. 12 illustrates a case where, in an operation illustrated in a left diagram (a route in FIG. 12) and an operation illustrated in a right diagram, the position and the pose of the TCP at each of the start point and the end point of the operation are the same as the start pose of the robot, but the end pose of the robot is different. As described above, even when the positions and poses of the TCP at the start point and the end point are the same, a difference occurs in the operation of the robot, and thus, a difference also occurs in the operation time.

Therefore, the pose planning unit 36 calculates a pose cost relating to the operation time of the robot required for the work for each combination of the start pose and the end pose that can be taken for each operation, and selects a combination of the start pose and the end pose with the highest evaluation indicated by the pose cost for each operation. The pose cost may be a difference between the start pose and the end pose, for example, an inter-vector distance of a value of a joint indicating each pose as indicated in the following formula (5).

[Mathematical Formula 4]

$$c = \sum_{i=0}^{m} |q_{i+1} - q_i| \qquad (5)$$

In the formula (5), m is a number of work points, and $q_i$ is a pose vector representing a pose corresponding to an i-th work point. This pose cost represents an estimated operation time on the assumption that the smaller the change between the poses, the shorter the operation time between the poses. Therefore, the combination of the poses with the highest evaluation indicated by the pose cost can be regarded as the combination with the shortest operation time between the poses. The pose planning unit 36 passes a set of combinations of a start pose and an end pose for each operation selected for each layout candidate to the route planning unit 38.

The route planning unit 38 calculates a route from the start pose to the end pose passed from the pose planning unit 36 for each operation for each layout candidate based on the specification information about the robot, the member information, and the work information passed from the acquisition unit 32. When there are other robots, members, and obstacles between the start pose and the end pose, the route planning unit 38 calculates a route so as to avoid interference with these robots, members, and obstacles. The route planning unit 38 passes a set of routes for each operation calculated for each layout candidate to the evaluation unit 40.

The evaluation unit 40 calculates a route cost for the route passed from the route planning unit 38, and selects an optimum layout from the layout candidates based on the route cost. Specifically, the evaluation unit 40 calculates, for each layout candidate, a sum of the operation times of the robot from the start pose to the end pose for each operation as the route cost based on the route, the dynamics information, and the like, for example, as shown in the following formula (6).

[Mathematical Formula 5]

$$c = \sum_{i=0}^{m} t_{i,i+1} \qquad (6)$$

In the formula (6), m is a number of work points, and $t_{i,i+1}$ is the operation time between the i-th work point and an (i+1)-th work point. Then, the evaluation unit 40 selects a layout candidate with the shortest operation time as the optimum layout. The evaluation unit 40 outputs layout information about the selected layout and operation information about the robot according to the route calculated for the layout. As described above, the operation information is obtained by adding information of a speed and acceleration for changing the pose to the route.

The route cost is not limited to the above operation time. For example, it may be a moment applied to the workpiece when the robot is operated along the route while the workpiece is gripped. A power consumption of the robot when the robot is operated along the route, a route length in a real space or a joint space, and the like may be used. A route cost for multipurpose optimization may be calculated by using a plurality of these costs.

Figure 13:
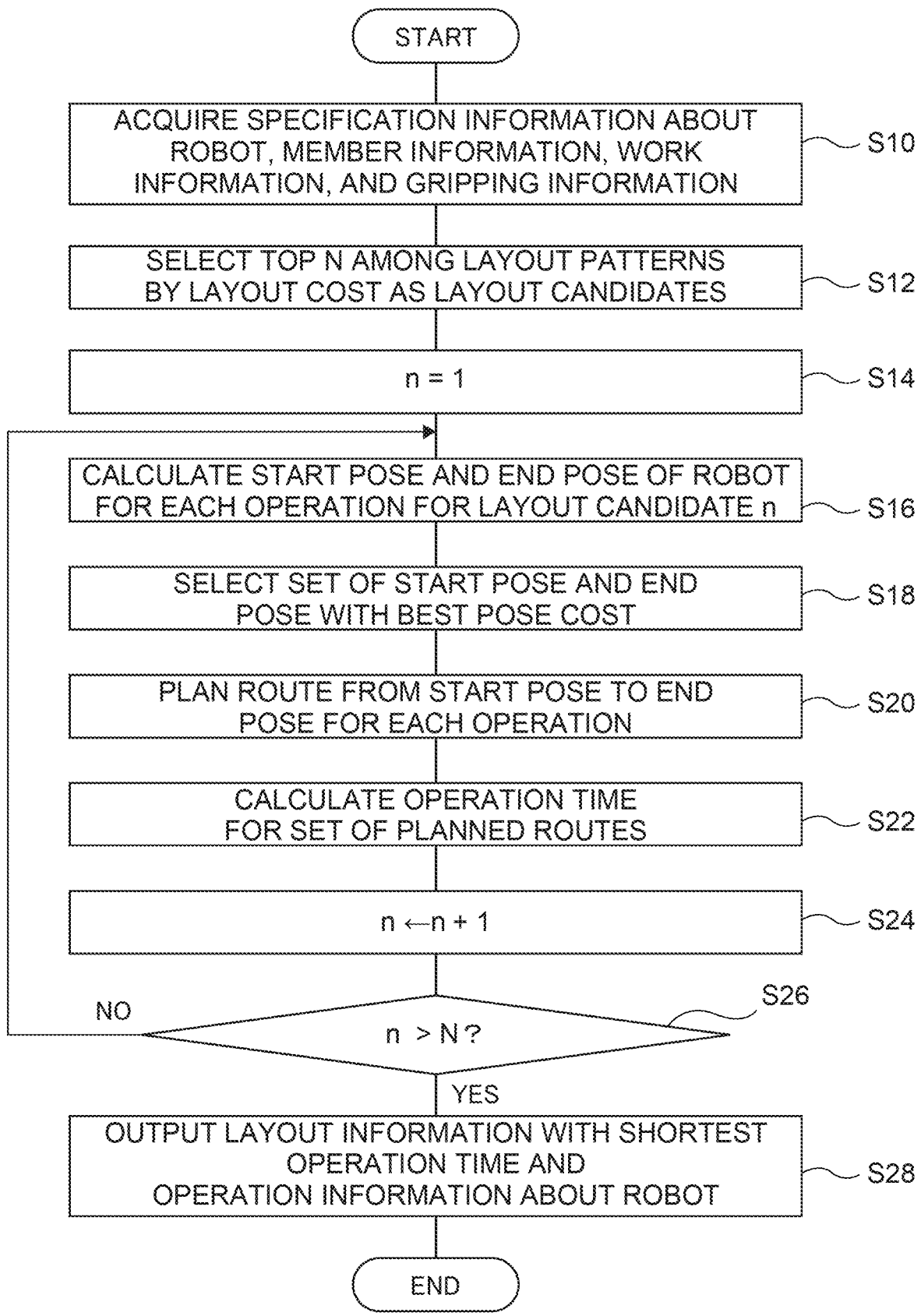
FIG. 13 is a flowchart illustrating a flow of robot cell system design processing according to the first embodiment.

Next, the operation of the robot cell system design device 10 according to the first embodiment will be described. FIG. 13 is a flowchart illustrating a flow of robot cell system design processing executed by the CPU 12 of the robot cell system design device 10. The CPU 12 reads the robot cell system design program from the storage device 16, develops the program in the memory 14, and executes the program, whereby the CPU 12 functions as each functional configuration of the robot cell system design device 10, and the robot cell system design processing illustrated in FIG. 13 is executed.

In step S10, the acquisition unit 32 acquires specification information about the robot, member information, work information, and gripping information. The acquisition unit 32 passes the acquired specification information about the robot, the member information, and the work information to each of the layout planning unit 34, the pose planning unit 36, and the route planning unit 38, and passes the acquired gripping information to the pose planning unit 36.

Next, in step S12, the layout planning unit 34 calculates a layout cost relating to the layout for each of the layout patterns of the robot and the member, and selects top N layout patterns in descending order of evaluation indicated by the layout cost as layout candidates. The layout planning unit 34 assigns numbers 1, 2, . . . , and N to the selected layout candidates in descending order of evaluation indicated by the layout cost. Hereinafter, a layout candidate of a number n is referred to as a "layout candidate n". Then, the layout planning unit 34 passes information on the selected layout candidate to the pose planning unit 36 and the route planning unit 38.

Next, in step S14, the pose planning unit 36 sets 1 to a variable n indicating the number of the layout candidate. Next, in step S16, the pose planning unit 36 calculates, for the layout candidate n, combinations of the start pose and the end pose of the robot that can be taken for each operation according to the position and the pose of the TCP at the start point and the end point of the operation based on the specification information about the robot, the member information, the work information, and the gripping information.

Next, in step S18, the pose planning unit 36 calculates a pose cost relating to the operation time of the robot required for the work for each combination of the start pose and the end pose, and selects a combination of the start pose and the end pose with the highest evaluation indicated by the pose cost for each operation. Then, the pose planning unit 36 passes a set of combinations of the start pose and the end pose for each operation selected for the layout candidate n to the route planning unit 38.

Next, in step S20, the route planning unit 38 calculates, for each operation, a route from the start pose to the end pose passed from the pose planning unit 36 for the layout candidate n based on the specification information about the robot, the member information, and the work information. Then, the route planning unit 38 passes a set of routes for each operation calculated for the layout candidate n to the evaluation unit 40.

Next, in step S22, the evaluation unit 40 calculates the operation time of the robot from the start pose to the end pose as a route cost based on the route, the dynamics information, and the like. Here, a case where the operation time is calculated as an example of the route cost has been described, but other route costs may be used. Next, in step S24, the evaluation unit 40 increments n by 1. Next, in step S26, the evaluation unit 40 determines whether n exceeds N, which is the number of layout candidates. When n≤N, the processing returns to step S16, and when n>N, the processing proceeds to step S28.

In step S28, the evaluation unit 40 selects a layout candidate with the shortest operation time as an optimum layout. Then, the evaluation unit 40 outputs layout information about the selected layout and operation information about the robot according to the route planned for the layout, and the robot cell system design processing ends.

As described above, the robot cell system design device according to the first embodiment acquires the specification information about the robot which is a component of the robot cell system, the member information including the shape information about the member other than the robot, and the work information relating to the work to be performed by the robot. The robot cell system design device plans one or more layout candidates of the robot and the member in the robot cell system based on the acquired information, and calculates a set of start poses and end poses for each operation of the robot performing the work for each layout candidate. Then, the robot cell system design device plans a set of routes from the start pose to the end pose for each planned operation for each layout candidate, and selects a final layout from the layout candidates based on the route cost relating to the route. As a result, it is possible to reduce the time required for designing a cell system including a robot as a component.

Since the layout of the robot and the member and the operation of the robot can be planned at the same time, man-hours required for a teaching work performed by a robot engineer after the mounting the cell system can also be reduced. Since the optimization using the cost is performed at the time of calculating the layout, the pose of the robot, and the route respectively, the system design is completed in a state where the operation of the robot has been verified, and it is possible to reduce a risk that a problem occurs after mounting the cell system and the design is performed again.

Second Embodiment

Next, a second embodiment will be described. In the robot cell system design device according to the second embodiment, the same reference numerals are given to the same configurations as those of the robot cell system design device 10 according to the first embodiment, and the detailed description thereof will be omitted. In the functional configuration in which last two digits of the reference numeral are common between the first embodiment and the second embodiment, detailed description of the common function will be omitted. Since a hardware configuration of the robot cell system design device according to the second embodiment is similar to the hardware configuration of the robot cell system design device 10 according to the first embodiment illustrated in FIG. 3, the description thereof will be omitted.

Figure 14:
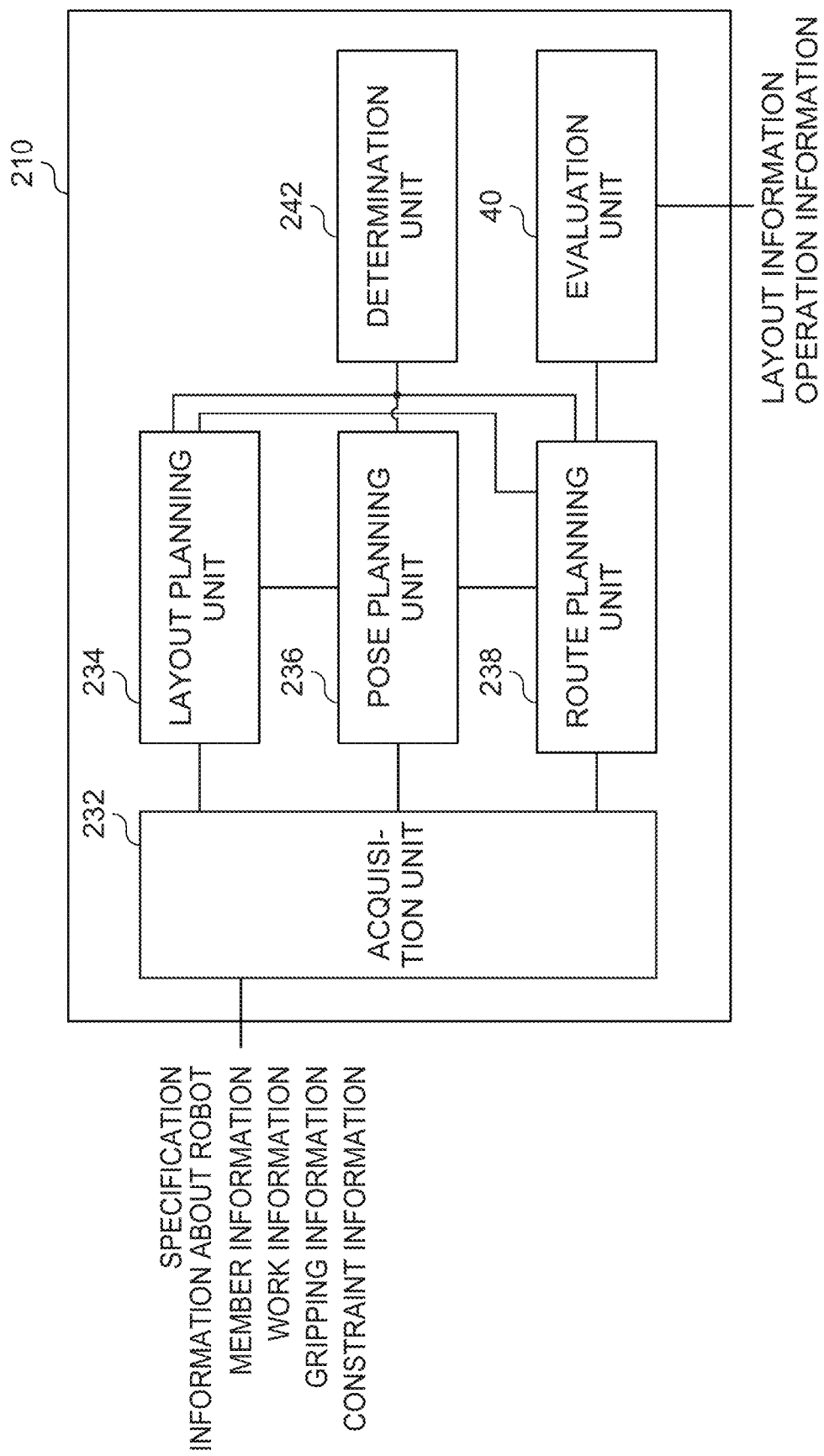
FIG. 14 is a block diagram illustrating an example of a functional configuration of a robot cell system design device according to a second embodiment.

A functional configuration of a robot cell system design device 210 according to the second embodiment will be described. FIG. 14 is a block diagram illustrating an example of the functional configuration of the robot cell system design device 210. As illustrated in FIG. 14, the robot cell system design device 210 includes an acquisition unit 232, a layout planning unit 234, a pose planning unit 236, a route planning unit 238, a determination unit 242, and an evaluation unit 40 as functional configurations. Each functional configuration is implemented by the CPU 12 reading the robot cell system design program stored in the storage device 16, developing the program in the memory 14, and executing the program.

The acquisition unit 232 acquires constraint information designated by a user in addition to the specification information about the robot, the member information, the work information, and the gripping information. The constraint information includes at least one of a positional relationship between members, an unarrangeable region of the member, a designated position where the member is arranged, a clearance with respect to the member, a designated work condition, a designated pose, and a designated route.

Figure 15:
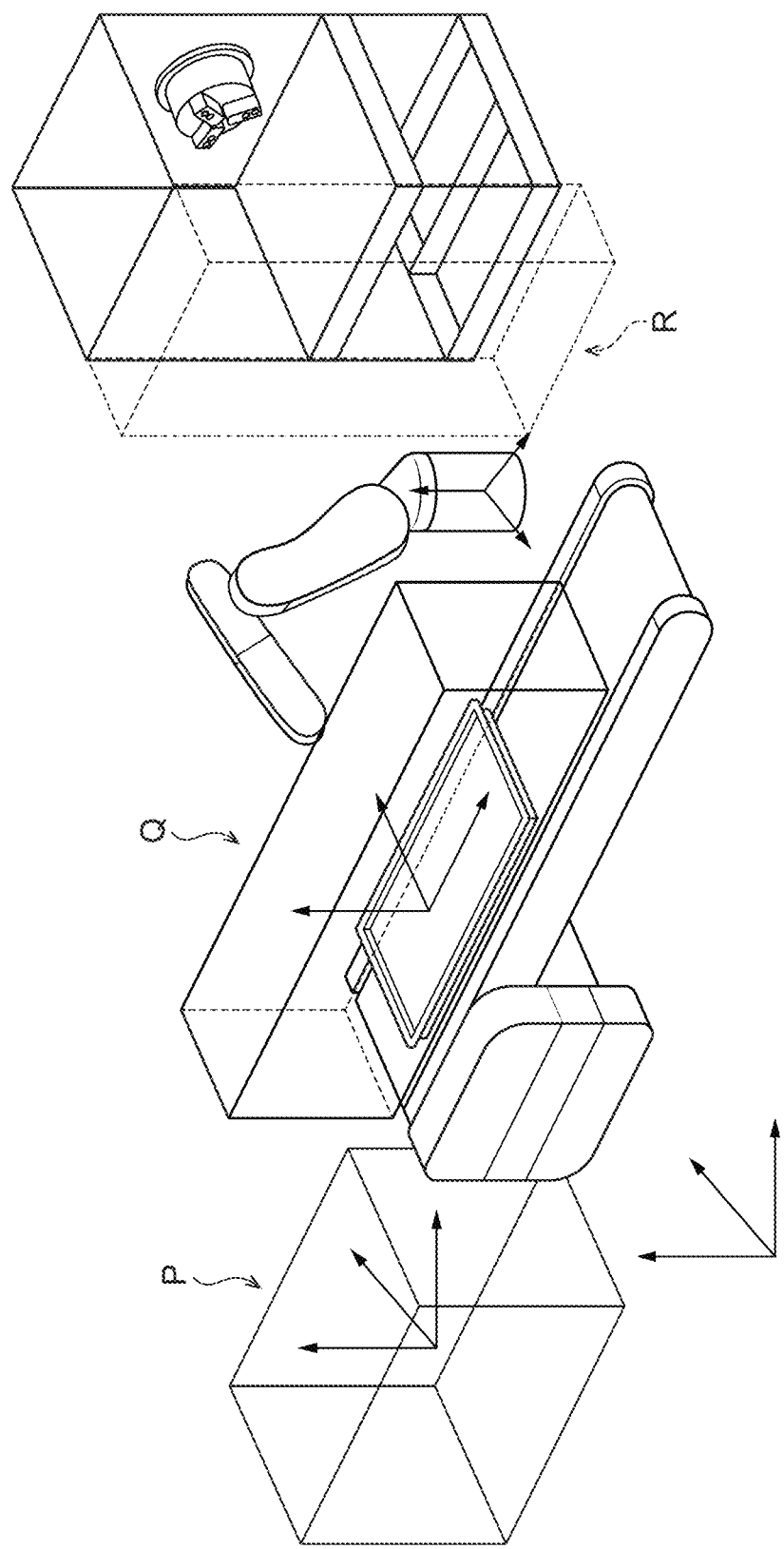
FIG. 15 is a diagram for describing an example of constraint information.

The constraint information on the positional relationship between the members is constraint information that designates a positional relationship such as arranging a layout of a member A and a member B side by side or arranging a member C and a member D apart from each other by 1 m or more in a local coordinate system of the members. For example, as illustrated in P of FIG. 15, the constraint information on the unarrangeable region of the member is constraint information in which a region where the robot and the member cannot be arranged, such as a region to be secured as a flow line of a person or a region where fixed equipment is arranged, is designated at a position of a world coordinate system. For example, as indicated by Q in FIG. 15, the constraint information on the designated position where the member is arranged is constraint information that designates the layout of the member determined to be arranged at a specific position, such as arranging a tray, which is one of the members on a conveyor (fixed equipment), at the position of the world coordinate system. The constraint information on the clearance for the member is, for example, constraint information in which a region where the robot and another member cannot be arranged, such as a space for opening and closing the door of the member, is designated at the position of the local coordinate system of the member as illustrated in R in FIG. 15.

Figure 16:
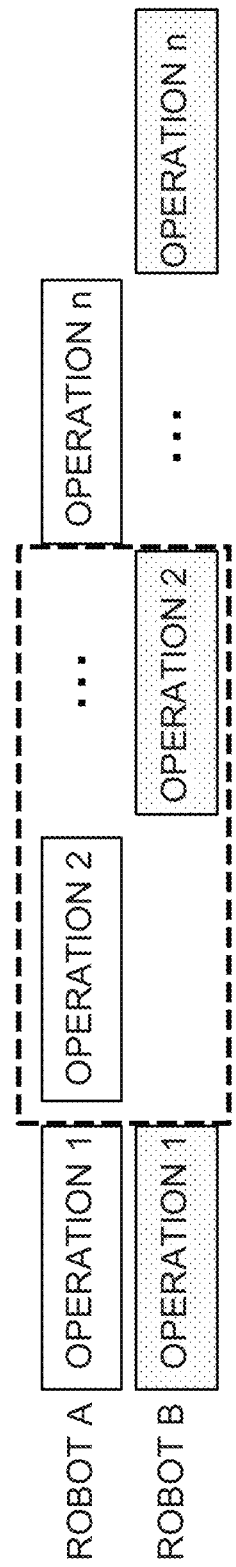
FIG. 16 is a diagram for describing an example of constraint information relating to work information.

The constraint information on the designated work condition is constraint information relating to a priority or an execution time of the work. In the constraint information on the priority of work, for example, as illustrated in FIG. 16, in a case in which a work is performed by a plurality of robots, an operation to be preferentially executed between robots is designated, such as starting an operation of one robot after completion of an operation of the other robot. In the example of FIG. 16, the priority is designated such that an operation 2 of a robot B is started after the operation 2 of a robot A is completed. In the constraint information on the execution time, for example, at least one of an upper limit and a lower limit of the execution time of one or a plurality of works executed in the cell system is designated. As a specific example, in order to match an operation timing of a conveyor that cannot be synchronously controlled with the robot, it may be designated that the work from picking a certain part by the robot to placing it at a next place is performed within two seconds or more and three seconds. In order to move a heated workpiece to a next work position before the workpiece is cooled, it may be designated that the work of conveying the workpiece is performed within two seconds.

The constraint information on the designated pose is constraint information in which the pose of the robot or the pose of the TCP at at least one position of a start point, an end point, and an arbitrary midpoint is designated in advance. The designated pose may be a specific value or a predetermined range. The constraint information on the designated route is constraint information in which at least a part of the route on which the robot operates is designated in advance. The designated route may be a route in which a specific value is designated as a value of a sequence of poses of the robot for a predetermined section, or may be a route in which an essential region through which the TCP should pass or a region through which the TCP cannot pass is designated. The constraint information is not limited to the above example, and any constraint information can be designated by the user.

When constraint information relating to a layout is acquired, the acquisition unit 232 passes the acquired constraint information to the layout planning unit 234. When constraint information relating to a pose is acquired, the acquisition unit 232 passes the acquired constraint information to the pose planning unit 236. When constraint information relating to a route is acquired, the acquisition unit 232 passes the acquired constraint information to the route planning unit 238. In a case in which one piece of constraint information is related to two or more of the layout, pose, and route, the acquisition unit 232 passes the constraint information to each of the two or more related planning units. For example, the constraint information on the designated work condition may be related to any of the layout, pose, and route.

When the constraint information relating to the layout is passed from the acquisition unit 232, the layout planning unit 234 selects a layout candidate from among the layout patterns of the robot and the member that satisfy the passed constraint information.

When the constraint information relating to the pose is passed from the acquisition unit 232, the pose planning unit 236 calculates a set of start poses and end poses that satisfies the passed constraint information.

When the constraint information relating to the route is passed from the acquisition unit 232, the route planning unit 238 calculates a set of routes that satisfies the passed constraint information.

The determination unit 242 determines appropriateness of the plan in each of the layout planning unit 234, the pose planning unit 236, and the route planning unit 238. The determination by the determination unit 242 is performed because the appropriateness of the plan in each planning unit may deteriorate in a case in which arbitrary constraint information is designated by the user. Specifically, the determination unit 242 determines whether a good solution can be obtained by determining whether a solution can be obtained and whether a predetermined cost has a solution satisfying a threshold in the optimization in each planning unit.

Figure 17:
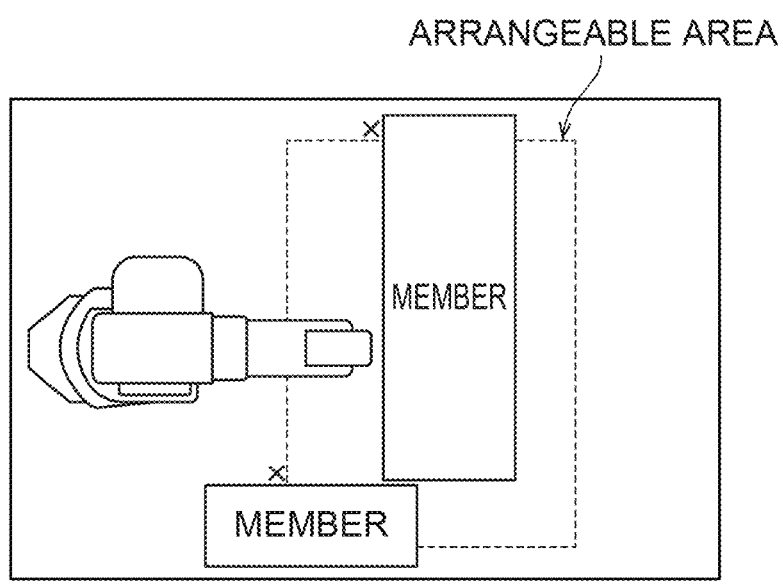
FIG. 17 is a diagram for describing an example of processing of a determination unit.

For example, in the optimization in the layout planning unit 234, the determination unit 242 determines whether a member falls within an arrangeable area as a determination as to whether a layout candidate which is a solution can be obtained. In each of all the layout candidates, for example, as illustrated in FIG. 17, when at least one member or robot does not fall within the arrangeable area for the member or robot, the determination unit 242 determines that a layout candidate which is a solution has not been obtained. That is, the determination unit 242 determines that a good solution has not been obtained in the layout planning unit 234.

Figure 18:
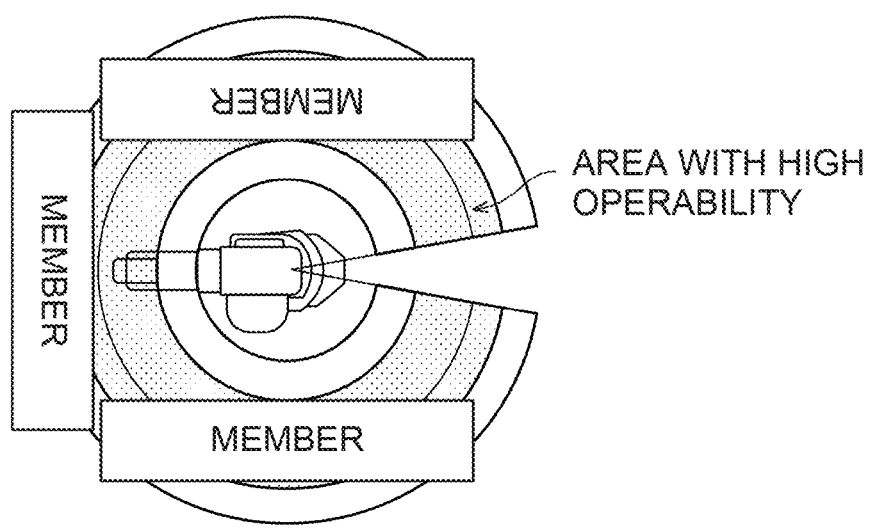
FIG. 18 is a diagram for describing an example of processing of the determination unit.

The determination unit 242 determines whether the layout cost for the layout candidate which is a solution satisfies a threshold in the optimization in the layout planning unit 234. FIG. 18 illustrates an example of a case where the determination is made by using a cost indicating the operability of the robot, which is an example of the layout cost. In this case, in a case in which the cost indicating the operability does not satisfy the threshold in each of all the layout candidates, the determination unit 242 determines that a good solution has not been obtained in the layout planning unit 234.

Figure 19:
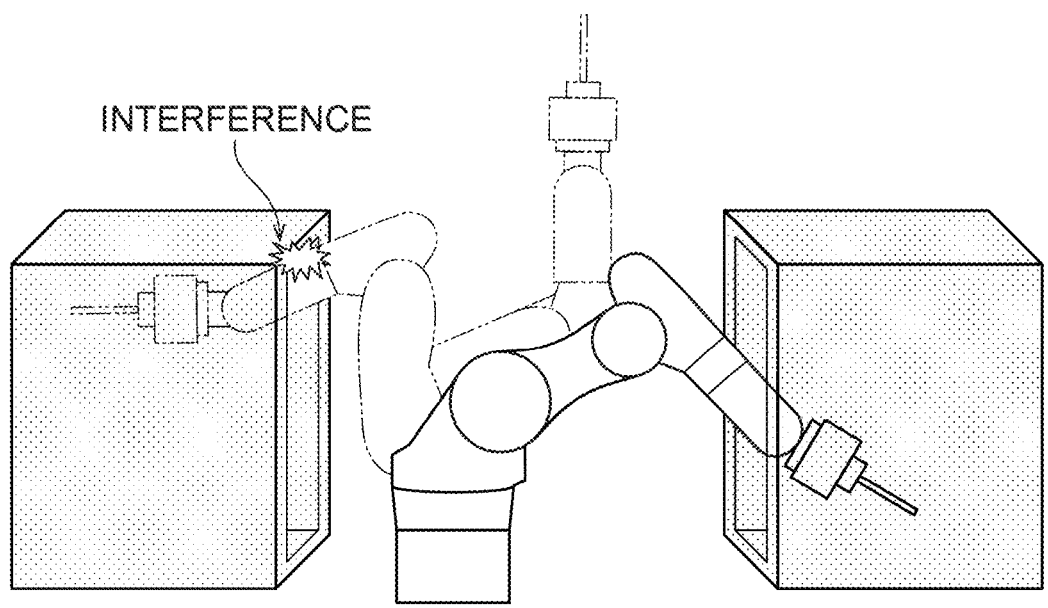
FIG. 19 is a diagram for describing an example of processing of the determination unit.

The determination unit 242 determines whether the robot interferes with another member or an obstacle when the robot takes a start pose or an end pose which is a solution in the optimization in the pose planning unit 236. In a case in which the start pose and the end pose are automatically calculated, a pose capable of avoiding interference is calculated. In this regard, in a case in which the pose is designated as the constraint information by the user, there is a possibility that interference occurs as illustrated in FIG. 19. In a case in which interference occurs in the start pose or the end pose in all combinations of the start pose and the end pose calculated by the pose planning unit 236 for each layout candidate, the determination unit 242 determines that a good solution has not been obtained in the pose planning unit 236.

Figure 20:
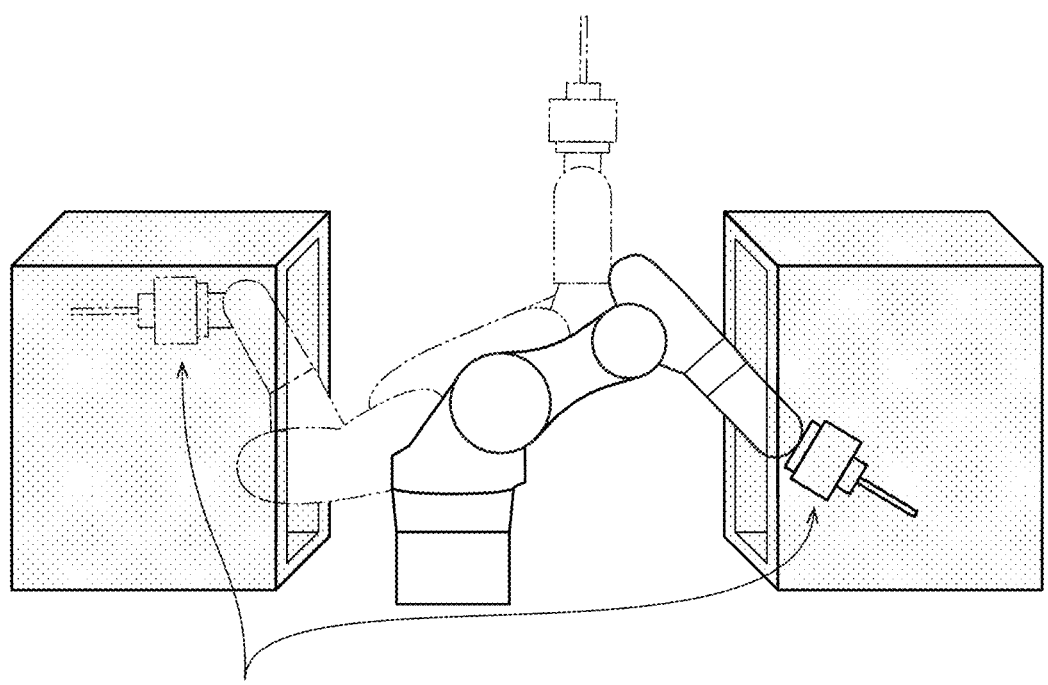
FIG. 20 is a diagram for describing an example of processing of the determination unit.

The determination unit 242 determines whether the pose cost for the start pose and the end pose that are solutions satisfies a threshold in the optimization in the pose planning unit 236. For example, as illustrated in FIG. 20, in a case in which the pose of the robot greatly changes between the start point and the end point of the operation, that is, in a case in which the difference between the start pose and the end pose is large, the evaluation indicated by the pose cost becomes low. In a case in which the pose cost does not satisfy the threshold in all the combinations of the start pose and the end pose calculated by the pose planning unit 236, the determination unit 242 determines that a good solution has not been obtained in the layout planning unit 234.

Figure 21:
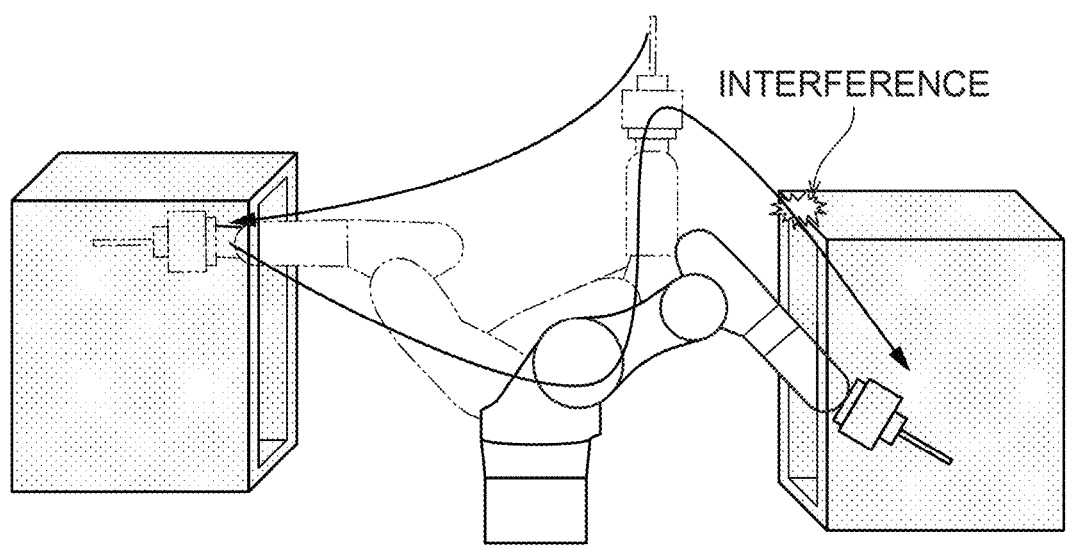
FIG. 21 is a diagram for describing an example of processing of the determination unit.

The determination unit 242 determines whether a route in which the robot does not interfere with another member or an obstacle can be calculated for each layout candidate in the optimization in the route planning unit 238. As illustrated in FIG. 21, in a case in which the robot interferes with another member or an obstacle in a route passing through the designated pose as the constraint information or a route partially including the designated route, the determination unit 242 determines that a route which is a solution cannot be planned for the layout candidate. That is, the determination unit 242 determines that a good solution has not been obtained for the layout candidate.

Figure 22:
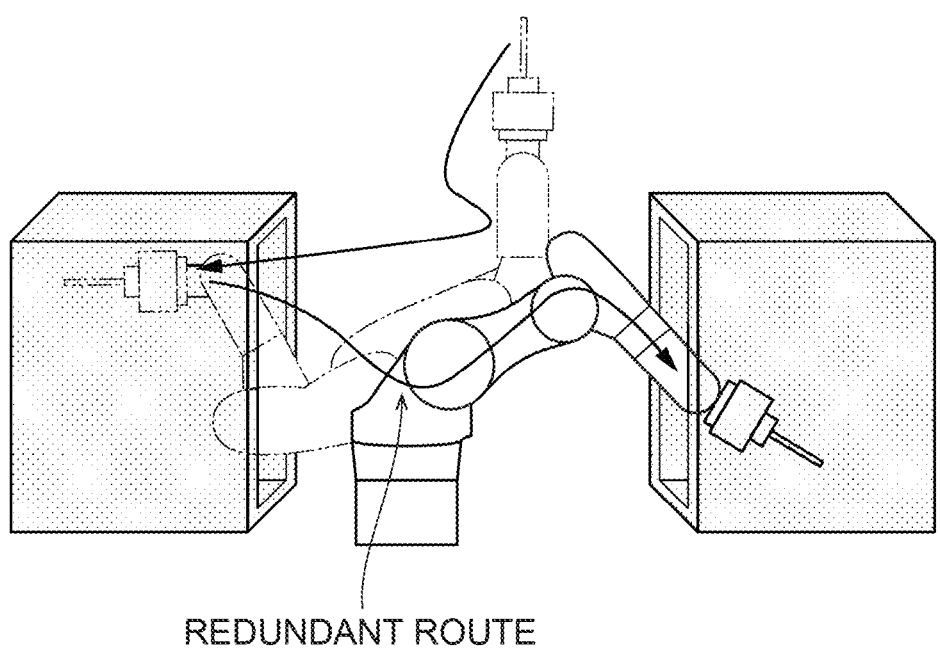
FIG. 22 is a diagram for describing an example of processing of the determination unit.

In the optimization in the route planning unit 238, the determination unit 242 determines whether the operation time of the robot required for the work is equal to or less than a predetermined value for each layout candidate. As illustrated in FIG. 22, in a case in which the route calculated in a case in which the designated pose and a part of the route are set as the constraint information is redundant, the operation time becomes long. When the operation time exceeds a predetermined value, the determination unit 242 determines that a good solution has not been obtained for the layout candidate.

The determination unit 242 may present the determination result to the user in a case in which it is determined that the plan by each planning unit does not satisfy the appropriateness, that is, a good solution cannot be obtained. The determination unit 242 includes, in the determination result, a content determined not to satisfy the appropriateness in the above determination, for example, a content in which the member does not fall within the arrangeable area, a content in which the member interferes with another member in the planned pose or route, and the like. The determination result presented to the user by the determination unit 242 is not limited to the determination result relating to the constraint information acquired by the acquisition unit 232. As described in the first embodiment, the layout, pose, and route planned by each planning unit may be similarly targeted based on the specification information about a robot, member information, work information, and gripping information.

In a case of determining that the plan of each planning unit does not satisfy the appropriateness, the determination unit 242 may stop the processing of the corresponding planning unit. In the present embodiment, since the layout plan, the pose plan, and the route plan are performed in stages, even when the plan of any planning unit is stopped, the layout information and the operation information about the robot, which are final outputs, are not output.

Figure 23:
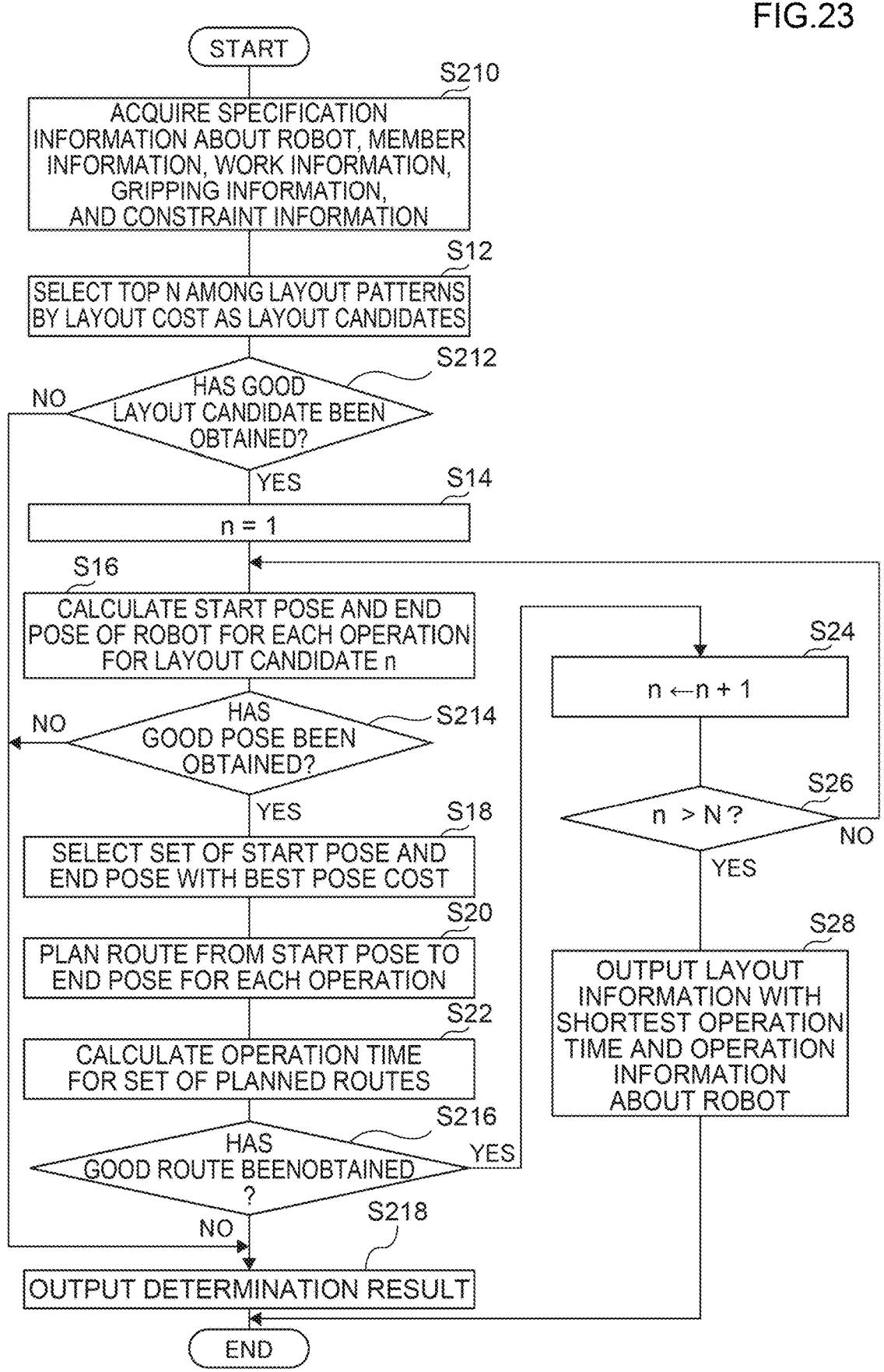
FIG. 23 is a flowchart illustrating a flow of robot cell system design processing according to the second embodiment.

Next, the operation of the robot cell system design device 210 according to the second embodiment will be described. FIG. 23 is a flowchart illustrating a flow of robot cell system design processing executed by the CPU 12 of the robot cell system design device 210. The CPU 12 reads the robot cell system design program from the storage device 16, develops the program in the memory 14, and executes the program, whereby the CPU 12 functions as each functional configuration of the robot cell system design device 210, and the robot cell system design processing illustrated in FIG. 23 is executed. In the robot cell system design processing illustrated in FIG. 23, the same step numbers are assigned to the same processing as the robot cell system design processing (FIG. 13) in the first embodiment, and the detailed description thereof is omitted.

In step S210, the acquisition unit 232 acquires specification information about a robot, member information, work information, gripping information, and constraint information designated by the user. The acquisition unit 232 passes the acquired information to the related planning unit.

When the processing proceeds to step S212 through the next step S12, the determination unit 242 determines whether a layout candidate which is a good solution has been obtained in step S12 by the layout planning unit 234. In a case in which the layout candidate which is a good solution has been obtained, the processing proceeds to step S14, and in a case in which the layout candidate which is a good solution has not been obtained, the processing proceeds to step S218.

When the processing proceeds to step S214 through steps S14 and S16, the determination unit 242 determines in step S16 whether the pose planning unit 236 has obtained a set of combinations of a start pose and an end pose, which is a good solution for a layout candidate n. In a case in which the set of combinations of the start pose and the end pose which is a good solution has been obtained, the processing proceeds to step S18, and in a case in which the set of combinations of the start pose and the end pose which is a good solution has not been obtained, the processing proceeds to step S218.

When the processing proceeds to step S216 through steps S18 to S22, the determination unit 242 determines in steps S20 and S22 whether the route planning unit 238 has obtained a set of routes which is a good solution for the layout candidate n. In a case in which the set of routes which is a good solution has been obtained, the processing proceeds to step S24, and in a case in which the set of routes which is a good solution has not been obtained, the processing proceeds to step S218.

In step S218, the determination unit 242 outputs a determination result including the content determined that a good solution cannot be obtained in the determination in step S212, S214, or S216, and the robot cell system design processing ends.

As described above, in the robot cell system design device according to the second embodiment, the layout, pose, and route are calculated in consideration of the constraint information designated by the user. As a result, user's intention that cannot be expressed by the specification information about the robot, the member information, and the work information can be reflected on the design. The processing time can be shortened by using the calculated result as the constraint information for a part of the layout, pose, or route.

In a case in which it is determined that a solution cannot be obtained or a predetermined cost for the solution does not satisfy the threshold, that is, a good solution cannot be obtained in the optimization in each planning unit, the robot cell system design device according to the second embodiment presents the content of the determination to the user. As a result, a designer of the robot cell system can efficiently modify the design.

Third Embodiment

Next, a third embodiment will be described. In the robot cell system design device according to the third embodiment, the same reference numerals are given to the same configurations as those of the robot cell system design device 10 according to the first embodiment, and the detailed description thereof will be omitted. In the functional configuration in which last two digits of the reference numeral are common between the first embodiment and the third embodiment, detailed description of the common function will be omitted. Since a hardware configuration of the robot cell system design device according to the third embodiment is similar to the hardware configuration of the robot cell system design device 10 according to the first embodiment illustrated in FIG. 3, the description thereof will be omitted.

Figure 24:
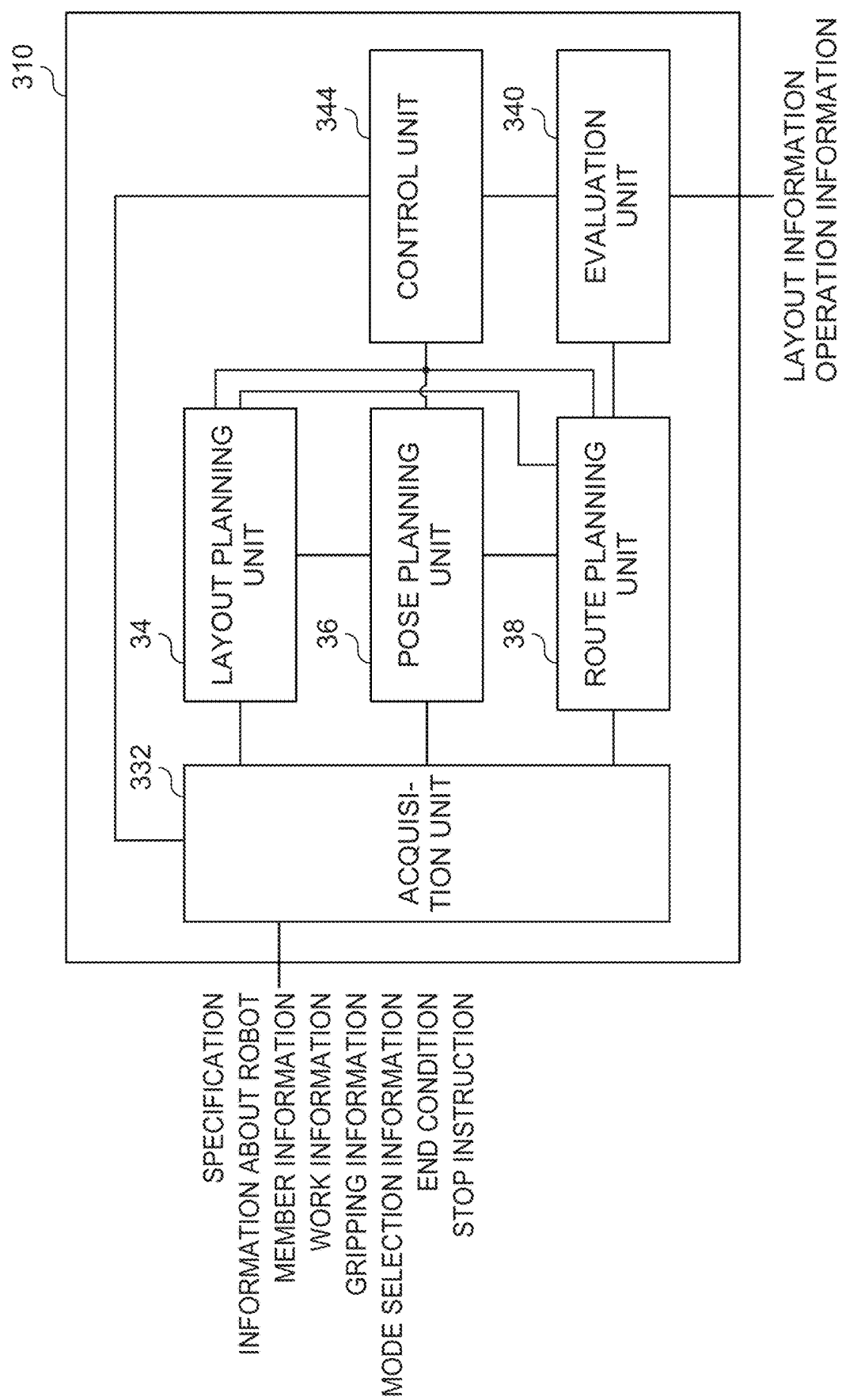
FIG. 24 is a block diagram illustrating an example of a functional configuration of a robot cell system design device according to a third embodiment.

A functional configuration of a robot cell system design device 310 according to the third embodiment will be described. FIG. 24 is a block diagram illustrating an example of the functional configuration of the robot cell system design device 310. As illustrated in FIG. 24, the robot cell system design device 310 includes an acquisition unit 332, a layout planning unit 34, a pose planning unit 36, a route planning unit 38, a control unit 344, and an evaluation unit 340 as functional configurations. Each functional configuration is implemented by the CPU 12 reading the robot cell system design program stored in the storage device 16, developing the program in the memory 14, and executing the program.

The acquisition unit 332 acquires mode selection information, an end condition, and a stop instruction designated by the user in addition to specification information about the robot, member information, work information, and gripping information. Here, the third embodiment has an executable planning mode and an optimum planning mode. The mode selection information is information obtained by selecting which one of the two modes to execute.

The executable planning mode is a mode for confirming in a short time whether a layout of a member for the robot to perform a predetermined operation can be implemented. In this regard, the optimum planning mode is a mode for outputting more optimum layout information and operation information.

It is assumed that the executable planning mode is selected during the design of the robot cell system. Specific examples of selecting the executable planning mode include a case of designing certain equipment and verifying whether the robot can work on the equipment, and a case of arranging the verified equipment around the robot and verifying whether a series of work can be executed. When a solution can be obtained in the executable planning mode, it can be determined that there is an executable layout in the relationship between the equipment being designed and the robot.

The optimum planning mode is assumed to be selected in a case in which, after the design of the robot cell system is once completed, layout adjustment or the like is performed with the aim of shortening the operation time of the entire system or the like.

The end condition is a condition for ending the plan repeatedly executed in each planning unit while changing the selection of the layout candidate. In a case in which the executable planning mode is selected, for example, a number of repetitions of the plan in each planning unit or a calculation time of the entire processing is designated as the end condition. Instead of designating the specific number of repetitions or a calculation time, an end condition such as repeating until a certain solution is obtained may be designated. In a case in which the optimum planning mode is selected, the number of repetitions and the calculation time similar to those in the executable planning mode may be designated as the end condition. As the number of repetitions and the calculation time in this case, a number of times or a calculation time larger than the number of repetitions or the calculation time of the end condition designated for the executable planning mode may be designated. In the case of the optimum planning mode, in addition to the number of repetitions and the calculation time, for example, a target operation time and a convergence determination threshold of an optimum solution (a solution update rate or the like) may be designated as the end condition. More specifically, the convergence determination threshold of the optimum solution is a threshold for determining that a difference between a route cost for a layout calculated this time and a best route cost for the layout calculated so far is small and the solution has converged.

The stop instruction is an instruction for stopping processing repeatedly executed in each planning unit when the optimum planning mode is selected.

The acquisition unit 332 passes the acquired mode selection information and end condition to the control unit 344. When the stop instruction is acquired, the acquisition unit 3332 notifies the control unit 344 of the stop instruction.

The control unit 344 controls the layout planning unit 34 to plan a layout candidate different from the previous layout candidate and causes the pose planning unit 36 and the route planning unit 38 to repeatedly execute the plan until a designated end condition is satisfied according to the selected mode. Then, the control unit 344 controls the evaluation unit 340 to select, as a final layout, a layout with the highest evaluation indicated by the route cost among layouts obtained for each repeated processing.

In a case in which the optimum planning mode is selected, when a stop instruction is notified from the acquisition unit 332, the control unit 344 performs control to stop the processing of each of the layout planning unit 34, the pose planning unit 36, and the route planning unit 38.

Similarly to the evaluation unit 40 in the first embodiment, the evaluation unit 340 calculates a route cost for a set of routes for each layout candidate passed from the route planning unit 38, and selects an optimum layout from the layout candidates based on the route cost. Specifically, the evaluation unit 340 selects, as the final layout, a layout with the highest evaluation indicated by the route cost, for example, with a short operation time, among the optimum layouts obtained for each repeated processing. The evaluation unit 340 outputs layout information on the selected layout and operation information about the robot according to the route planned for the layout.

Figure 25:
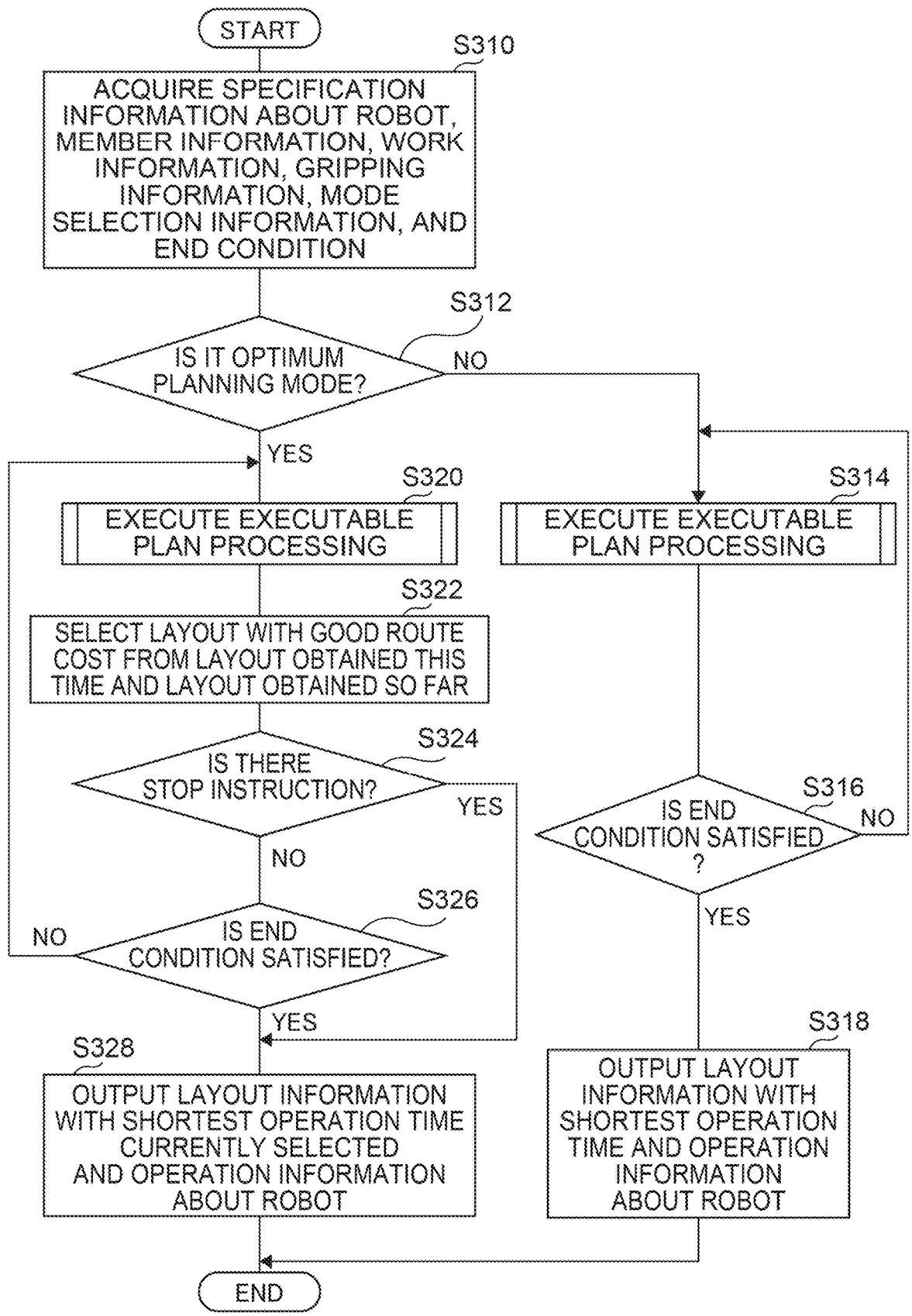
FIG. 25 is a flowchart illustrating a flow of robot cell system design processing according to a third embodiment.

Next, the operation of the robot cell system design device 310 according to the third embodiment will be described. FIG. 25 is a flowchart illustrating a flow of robot cell system design processing executed by the CPU 12 of the robot cell system design device 310. The CPU 12 reads the robot cell system design program from the storage device 16, develops the program in the memory 14, and executes the program, whereby the CPU 12 functions as each functional configuration of the robot cell system design device 310, and the robot cell system design processing illustrated in FIG. 25 is executed.

In step S310, the acquisition unit 332 acquires specification information about the robot, member information, work information, gripping information, mode selection information selected by the user, and an end condition designated by the user. The acquisition unit 332 passes the acquired specification information about the robot, member information, work information, and gripping information to the related planning unit, and passes the acquired mode selection information and end condition to the control unit 344.

Next, in step S312, the control unit 344 determines whether an optimum planning mode or an executable planning mode is selected based on the mode selection information passed from the acquisition unit 332. When the optimum planning mode is selected, the processing proceeds to step S320, and when the executable planning mode is selected, the processing proceeds to step S314.

In step S314, executable plan processing is executed. The executable plan processing is similar to steps S12 to S28 of the robot cell system design processing (FIG. 13) in the first embodiment. Next, in step S316, the control unit 344 determines whether the designated end condition is satisfied. For example, the control unit 344 determines whether a number of repetitions of the processing in step S314 has reached the number of repetitions designated in the end condition, whether a calculation time of the processing so far exceeds the calculation time designated in the end condition, and the like. In a case in which the end condition is satisfied, the processing proceeds to step S318, and in a case in which the end condition is not satisfied, the processing returns to step S314. In the selection of the layout candidate in the executable plan processing of S314 repeatedly executed, layout candidates other than the layout candidate previously selected are selected. In step S318, the layout information about the layout with the highest evaluation indicated by the route cost among the optimum routes planned in step S314, for example, the layout with the shortest operation time, and the operation information about the robot according to the route planned for the layout are output. Then, the robot cell system design processing ends.

In this regard, the executable plan processing is also executed in step S320. When the executable plan processing is executed in step S320, the processing proceeds to step S322.

In step S322, the evaluation unit 340 selects a layout with a higher route cost, for example, a layout with a shorter operation time, from the layout obtained in step S320 above and the layout obtained in the repeated processing so far. The control unit 344 presents the layout information about the layout selected by the evaluation unit 340 and the operation information about the robot according to the route planned for the layout to the user, and makes it possible to receive a stop instruction from the user. For example, the control unit 344 displays, on the output device 20, a stop button for the user to select a stop instruction together with the layout information and the operation information about the currently selected layout. The control unit 344 may also present the route cost calculated for the layout information to the user together with the layout information and the operation information.

Next, in step S324, the control unit 344 determines whether a stop instruction is selected by the user. For example, when the user selects the stop button, the acquisition unit 332 acquires a stop instruction and notifies the control unit 344 of the stop instruction. In this case, it is determined that the stop instruction is selected. When the stop instruction is selected, the processing proceeds to step S328, and when the stop instruction is not selected, the processing proceeds to step S326. In step S326, the control unit 344 determines whether the designated end condition is satisfied. For example, the control unit 344 determines whether the operation time indicated by the route cost for the layout selected in step S322 satisfies a target operation time, whether the difference between the route costs compared in step S322 satisfies the convergence determination threshold, and the like. In a case in which the end condition is satisfied, the processing proceeds to step S328, and in a case in which the end condition is not satisfied, the processing returns to step S320. In the selection of the layout candidate in the executable plan processing of S320 repeatedly executed, layout candidates other than the layout candidate previously selected are selected.

In step S328, the evaluation unit 340 outputs the layout information about the layout selected in the most recent step S322 and the operation information about the robot according to the route planned for the layout, and the robot cell system design processing ends.

As described above, the robot cell system design device according to the third embodiment selectively executes the optimum planning mode for obtaining an optimum solution over time and the executable planning mode for obtaining a solution that can be executed in a short time. As a result, it is possible to obtain appropriate layout information and operation information about the robot according to the design stage and purpose of the robot cell system.

In general, even in a case in which the layout information about the executable layout and the operation information are searched, it takes about several hours, for example, when a person performs the search by trial and error. According to the present embodiment, in the executable planning mode, the layout information and the operation information can be obtained in a time unit of minutes. In a case in which a person searches for layout information and operation information about a more optimum layout, high skill and experience are required for teaching adjustment work and a robot operation, and it may take several days to several weeks even for a skilled person. According to the present embodiment, even in the optimum planning mode, it is possible to obtain the layout information and the operation information about a more optimum layout in about several hours. Therefore, for example, in a case of verifying the layout in the relationship between each member and the robot, or in the middle of designing the cell system, the executable planning mode for a short time is selected, and in the stage where the entire design is completed, the optimum solution mode is selected in order to shorten the operation time. As described above, by selectively using the modes, the design of the robot cell system can be efficiently advanced.

The robot cell system design device according to the third embodiment presents currently best layout information and operation information for each repeated processing in the optimum planning mode, and can receive a stop instruction. As a result, in a case in which convergence of optimization is poor, in a case in which performance desired by the user has been reached early, or the like, the processing can be stopped by an instruction of the user, and unnecessary processing time can be reduced.

Fourth Embodiment

Next, a fourth embodiment will be described. In the robot cell system design device according to the fourth embodiment, the same reference numerals are given to the same configurations as those of the robot cell system design device 10 according to the first embodiment, and the detailed description thereof will be omitted. In a functional configuration in which last two digits of the reference numeral are common between the first embodiment and the fourth embodiment, detailed description of the common function will be omitted. Since a hardware configuration of the robot cell system design device according to the fourth embodiment is similar to the hardware configuration of the robot cell system design device 10 according to the first embodiment illustrated in FIG. 3, the description thereof will be omitted.

Figure 26:
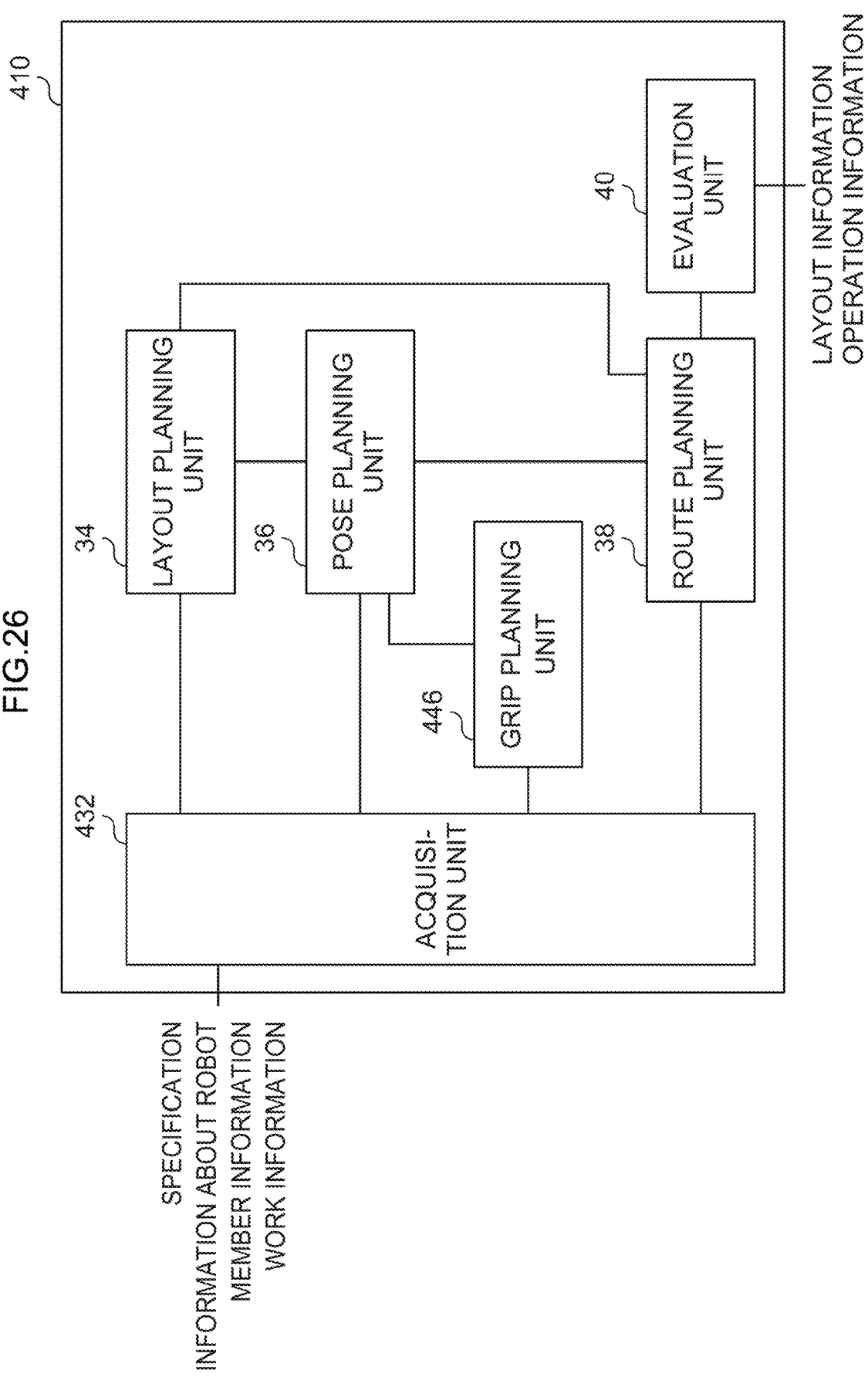
FIG. 26 is a block diagram illustrating an example of a functional configuration of a robot cell system design device according to a fourth embodiment.

A functional configuration of a robot cell system design device 410 according to the fourth embodiment will be described. FIG. 26 is a block diagram illustrating an example of the functional configuration of the robot cell system design device 410. As illustrated in FIG. 26, the robot cell system design device 410 includes an acquisition unit 432, a grip planning unit 446, a layout planning unit 34, a pose planning unit 36, a route planning unit 38, and an evaluation unit 40 as functional configurations. Each functional configuration is implemented by the CPU 12 reading the robot cell system design program stored in the storage device 16, developing the program in the memory 14, and executing the program.

Similarly to the acquisition unit 32 in the first embodiment, the acquisition unit 432 acquires specification information about the robot, member information, and work information. However, the acquisition unit 432 does not acquire gripping information acquired by the acquisition unit 32 in the first embodiment. The acquisition unit 432 also passes the acquired specification information about the robot, the member information, and the work information to the grip planning unit 446.

Figure 27:
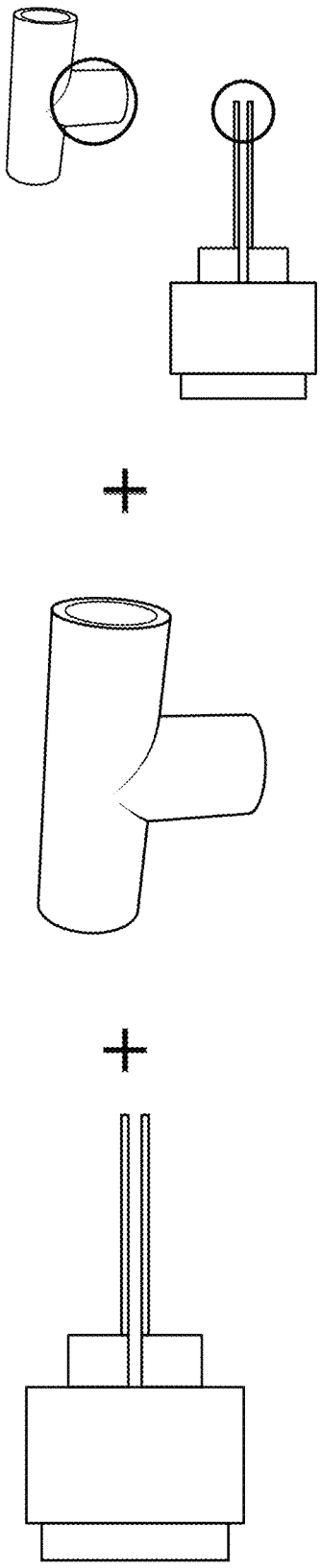
FIG. 27 is a diagram for describing generation of gripping information.

The grip planning unit 446 generates gripping information for each workpiece based on the specification information about the robot, the member information, and the work information passed from the acquisition unit 432, and passes the gripping information to the pose planning unit 36. Specifically, as illustrated in FIG. 27, the grip planning unit 446 specifies a shape of a robot hand that grips a workpiece from the specification information about the robot. The grip planning unit 446 specifies a shape of a workpiece to be gripped by the robot hand from the member information. The grip planning unit 446 specifies a gripping state indicating which portion of the workpiece is gripped by which portion of the robot hand from the work information. In the example of FIG. 27, it is represented that it is defined in the work information that a portion of the workpiece is gripped by a portion of the robot hand indicated by a circle.

The grip planning unit 446 generates a plurality of gripping patterns as illustrated in FIG. 5 based on the shape of the robot hand, the shape of the workpiece, and the gripping state specified as described above. Then, for each of the gripping patterns, the grip planning unit 446 generates gripping information represented by relative coordinates (x, y, z) and a relative pose (roll, pitch, yaw) of the TCP with respect to the workpiece when the workpiece is gripped by the robot hand.

Figure 28:
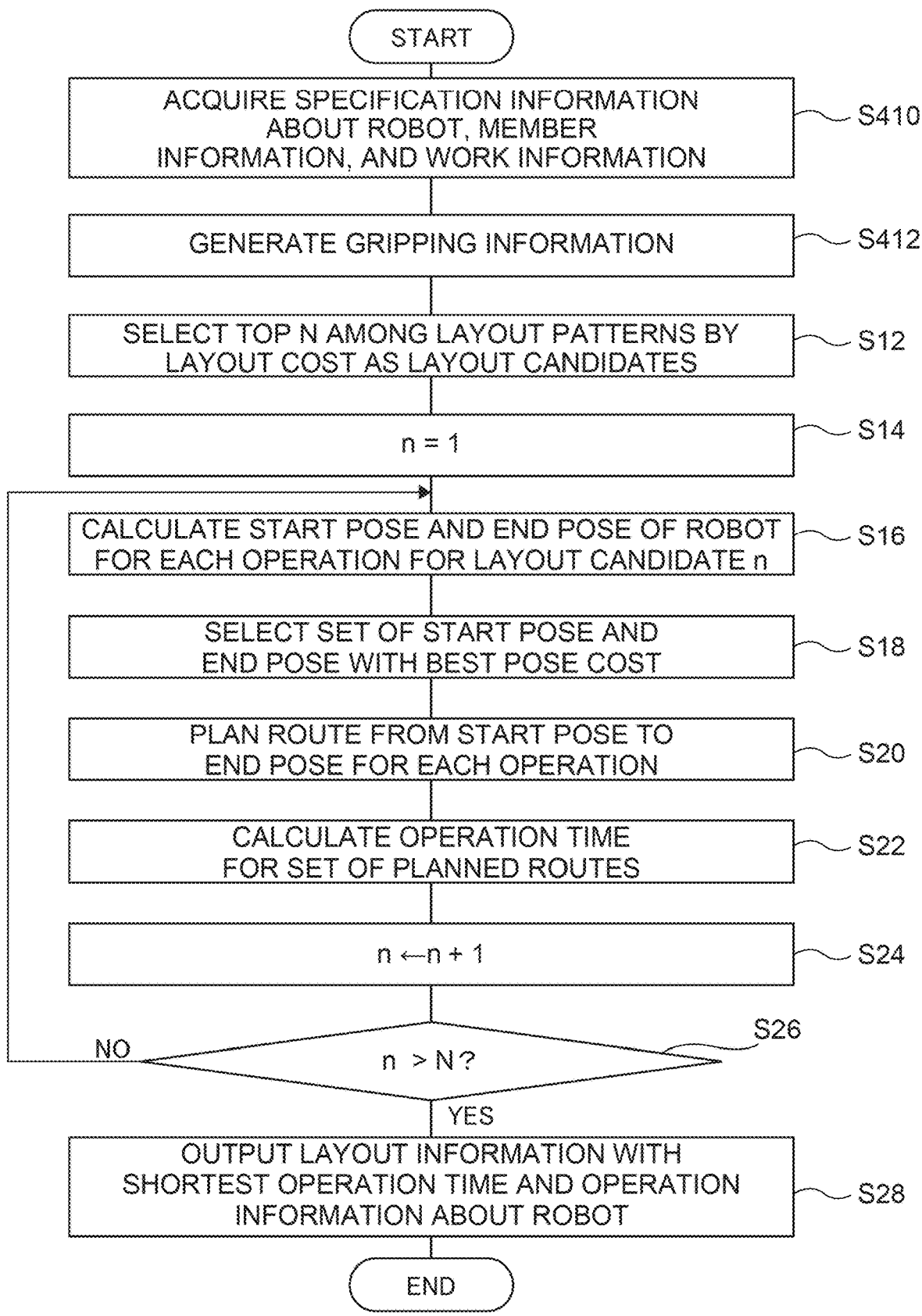
FIG. 28 is a flowchart illustrating a flow of robot cell system design processing according to the fourth embodiment.

Next, the operation of the robot cell system design device 410 according to the fourth embodiment will be described. FIG. 28 is a flowchart illustrating a flow of robot cell system design processing executed by the CPU 12 of the robot cell system design device 410. The CPU 12 reads the robot cell system design program from the storage device 16, develops the program in the memory 14, and executes the program, whereby the CPU 12 functions as each functional configuration of the robot cell system design device 410, and the robot cell system design processing illustrated in FIG. 28 is executed. In the robot cell system design processing illustrated in FIG. 28, the same step numbers are assigned to the same processing as the robot cell system design processing (FIG. 13) in the first embodiment, and the detailed description thereof is omitted.

In step S410, the acquisition unit 432 acquires specification information about the robot, member information, and work information. Then, the acquisition unit 432 passes the acquired specification information about the robot, the member information, and the work information to each planning unit including the grip planning unit 446.

Next, in step S412, the grip planning unit 446 specifies a shape of the robot hand, a shape of the workpiece, and a gripping state based on the specification information about the robot, the member information, and the work information, and generates a plurality of gripping patterns based on the specified contents. Then, for each of the gripping patterns, the grip planning unit 446 generates gripping information represented by relative coordinates (x, y, z) and a relative pose (roll, pitch, yaw) of the TCP with respect to the workpiece when the workpiece is gripped by the robot hand. The grip planning unit 446 passes the generated gripping information to the pose planning unit 36.

Thereafter, similarly to the robot cell system design processing (FIG. 13) in the first embodiment, steps S12 to S28 are executed, and the robot cell system design processing ends.

As described above, the robot cell system design device according to the fourth embodiment generates the gripping information based on the specification information about the robot, the member information, and the work information. As a result, it is not necessary to prepare the gripping information in advance, and a burden on the user can be reduced.

In each of the above embodiments, the number of robots included in the robot cell system may be one or a plurality of robots. When a plurality of robots are included, a robot cell system capable of coping with more complicated work can be constructed.

The disclosed technique can be applied to an off-line teaching tool of a robot, a simulation tool such as a cyber-physical system (CPS), CAD, and the like.

Various processors other than the CPU may execute the robot cell system design processing executed by the CPU reading the software (program) in each of the above embodiments. Examples of the processor in this case include a programmable logic device (PLD) in which a circuit configuration can be changed after manufacture such as a field-programmable gate array (FPGA) or the like, a dedicated electric circuit that is a processor having a circuit configuration exclusively designed for executing specific processing such as an application specific integrated circuit (ASIC) or the like. The robot cell system design processing may be executed by one of these various processors, or may be executed by a combination of two or more processors of the same type or different types (for example, a plurality of FPGAs, a combination of a CPU and an FPGA, and the like). More specifically, the hardware structure of these various processors is an electric circuit in which circuit elements such as semiconductor elements are combined.

In each of the above embodiments, an aspect in which the robot cell system design program is stored (installed) in the storage device in advance has been described, but the disclosure is not limited thereto. The program may be provided in a form stored in a storage medium such as a CD-ROM, a DVD-ROM, a Blu-ray disk, or a USB memory. The program may be downloaded from an external device via a network.

All documents, patent applications, and technical standards described in this specification are incorporated herein by reference to the same extent as if each document, patent application, and technical standard were specifically and individually indicated to be incorporated by reference.

REFERENCE SIGNS LIST 10, 210, 310, 410 Robot cell system design device
12 CPU

14 Memory
16 Storage device
18 Input device
20 Output device
22 Storage medium reading device
24 Communication I/F
26 Bus
32, 232, 332, 432 Acquisition unit
34, 234 Layout planning unit
36, 236 Pose planning unit
38, 238 Route planning unit
40, 340 Evaluation unit
242 Determination unit
344 Control unit
446 Grip planning unit

The invention claimed is:

1. A robot cell system design device comprising:
one or more processors configured to perform:
acquisition operation for acquiring specification information about a robot that is a component of a robot cell system, member information including shape information about a member, other than the robot, which is also a component of the robot cell system, and work information relating to work to be performed by the robot;
layout planning operation for calculating, based on the specification information, the member information, and the work information, one or more layout candidates for the robot and the member in the robot cell system;
pose planning operation for calculating, based on the specification information, the member information, and the work information, for each layout candidate, a set of combinations of a start pose at a start point and an end pose at an end point of each operation of the robot;
route planning operation for calculating, based on the specification information, the member information, and the work information, for each layout candidate, a set of routes from the start pose to the end pose of each combination of the start pose and the end pose;
evaluation operation for selecting, based on the routes, an optimum layout from the layout candidates; and
wherein the one or more processors are further configured to cause the robot to operate based on the optimum layout.

2. The robot cell system design device according to claim 1, wherein the one or more processors are configured to calculate a route cost relating to the routes for each of the layout candidates, and select a layout candidate with a highest evaluation indicated by the route cost, as the optimum layout.

3. The robot cell system design device according to claim 1, the one or more processors are configured to calculate a layout cost relating to a layout for each layout pattern of the robot and the member, and select one or more patterns in descending order of evaluation indicated by the layout cost or one or more patterns in which the layout cost satisfies a predetermined condition, as the layout candidate.

4. The robot cell system design device according to claim 3, wherein the layout cost is a value based on at least one of a distance between members, an area or a volume of a region where the robot and the member are arranged, a distance between an obstacle and the member, or operability of the robot.

5. The robot cell system design device according to claim 1, wherein the one or more processors are configured to select, for each operation, a combination with a highest evaluation indicated by a pose cost relating to an operation time of the robot required for the work, among combinations of the start pose and the end pose according to a position and a pose when a hand part of the robot accesses the member.

6. The robot cell system design device according to claim 5, wherein the one or more processors are configured to calculate the start pose and the end pose by further using gripping information indicating a relative relationship between the hand part of the robot and a workpiece gripped by the hand part of the robot.

7. The robot cell system design device according to claim 6, wherein the one or more processors are further configured to calculate the gripping information based on the specification information, the member information, and the work information.

8. The robot cell system design device according to claim 1, wherein:
the one or more processors are further configured to:
acquire constraint information designated by a user,
select, in a case in which constraint information relating to a layout is acquired as the constraint information, the layout candidate from among layout patterns of the robot and the member, the layout patterns satisfying the constraint information,
calculate, in a case in which constraint information relating to a pose is acquired as the constraint information, a set of combinations of the start pose and the end pose satisfying the constraint information, and
calculate, in a case in which constraint information relating to a route is acquired as the constraint information, a set of routes satisfying the constraint information.

9. The robot cell system design device according to claim 8, wherein the constraint information includes at least one of a positional relationship between members, an unarrangeable region of the member, a designated position where the member is arranged, a clearance with respect to the member, a designated pose, or a designated route.

10. The robot cell system design device according to claim 8,
wherein the one or more processors are configured to determine appropriateness of a plan in each of the layout planning operation, the pose planning operation and the route planning operation.

11. The robot cell system design device according to claim 10, wherein wherein the one or more processors are configured to present a determination result to the user in a case in which it is determined that the appropriateness of the plan is not satisfied.

12. The robot cell system design device according to claim 10, wherein the one or more processors are configured to stop processing each of the layout planning operation, the pose planning operation and the route planning operation based on a determination that the appropriateness of the plan is not satisfied.

13. The robot cell system design device according to claim 10, wherein the one or more processors are configured to determine that the appropriateness of the plan is satisfied:
in layout candidates planned by the one or more processors, in a case in which the member falls within an arrangeable area, and in a case in which a layout cost indicating appropriateness of a layout is equal to or more than a threshold,
in a case in which the start pose and the end pose planned by the one or more processors do not interfere with another member or an obstacle, and in a case in which a difference between the start pose and the end pose is equal to or less than a threshold, and
in a case in which the route can be calculated by the one or more processors, and in a case in which an operation time of the robot required for the work is equal to or less than a predetermined value.

14. The robot cell system design device according to claim 1, wherein:
the one or more processors are further configured to acquire selection information for selecting an executable planning mode for obtaining a solution and an optimum planning mode for obtaining a desired solution, and an end condition according to the executable planning mode or the optimum planning mode to be selected, and
the one or more processors are further configured to perform control the layout planning operation to calculate the layout candidate different from a previous layout until the end condition is satisfied, control the pose planning operation and the route planning operation to be repeatedly executed, and control the evaluation operation to select a final layout based on a route from the optimum layout obtained for each repeated operation.

15. The robot cell system design device according to claim 14, wherein in a case in which the optimum planning mode is selected, the one or more processors are configured to present, to a user, a layout with a highest evaluation indicated by a route cost at a current stage for each repeated operation, and to receive an instruction to stop each repeatedly executed operation from the user.

16. A robot cell system design method comprising:
acquiring, by one or more processors, specification information about a robot that is a component of a robot cell system, member information including shape information about a member, other than the robot, which is also a component of the robot cell system, and work information relating to work to be performed by the robot;
calculating, by the one or more processors, based on the specification information, the member information, and the work information, one or more layout candidates for the robot and the member in the robot cell system;
calculating, by the one or more processors, based on the specification information, the member information, and the work information, for each layout candidate, a set of combinations of a start pose at a start point and an end pose at an end point of each operation of the robot;
calculating, by the one or more processors, based on the specification information, the member information, and the work information, for each layout candidate, a set of routes from the start pose to the end pose of each combination of the start pose and the end pose;
selecting, by the one or more processors, based on the routes, an optimum layout from the layout candidates; and
causing, by the one or more processors, the robot to operate based on the optimum layout.

17. A non-transitory storage medium storing a robot cell system design program for causing a computer to perform:
acquiring specification information about a robot that is a component of a robot cell system, member information including shape information about a member, other than the robot, which is also a component of the robot cell system, and work information relating to work to be performed by the robot;
calculating, based on the specification information, the member information, and the work information, one or more layout candidates for the robot and the member in the robot cell system;
calculating, based on the specification information, the member information, and the work information, for each layout candidate, a set of combinations of a start pose at a start point and an end pose at an end point of each operation of the robot;
calculating, based on the specification information, the member information, and the work information, for each layout candidate, a set of routes from the start pose to the end pose of each combination of the start pose and the end pose;
selecting, based on the routes, an optimum layout from the layout candidates; and
causing the robot to operate based on the optimum layout.

* * * * *